US010592982B2

(12) United States Patent
Samler et al.

(10) Patent No.: US 10,592,982 B2
(45) Date of Patent: *Mar. 17, 2020

(54) SYSTEM AND METHOD FOR IDENTIFYING RELATED CREDIT INQUIRIES

(71) Applicant: CSIdentity Corporation, Austin, TX (US)

(72) Inventors: Steven E. Samler, Andover, MA (US); Matthew Hall, San Luis Obispo, CA (US)

(73) Assignee: CSIDENTITY CORPORATION, Austin, TX (US)

(*) Notice: Subject to any disclaimer, the term of this patent is extended or adjusted under 35 U.S.C. 154(b) by 509 days.

This patent is subject to a terminal disclaimer.

(21) Appl. No.: 15/434,551

(22) Filed: Feb. 16, 2017

(65) Prior Publication Data
US 2017/0287065 A1 Oct. 5, 2017

Related U.S. Application Data

(63) Continuation of application No. 14/323,751, filed on Jul. 3, 2014, now Pat. No. 9,595,066, which is a continuation of application No. 13/282,566, filed on Mar. 14, 2013, now Pat. No. 8,812,387.

(51) Int. Cl.
G06Q 40/02 (2012.01)
(52) U.S. Cl.
CPC .................. G06Q 40/025 (2013.01)
(58) Field of Classification Search
CPC .................. G06Q 40/02; G06Q 40/025
See application file for complete search history.

(56) References Cited

U.S. PATENT DOCUMENTS

| 2,074,513 A | 3/1937 | Mills |
| 3,316,395 A | 4/1967 | Lavin et al. |
| 3,752,904 A | 8/1973 | Waterbury |

(Continued)

FOREIGN PATENT DOCUMENTS

| CN | 104877993 | 9/2015 |
| DE | 91 08 341 | 10/1991 |

(Continued)

OTHER PUBLICATIONS

Experian Team, "Impact on credit scores of inquiries for an auto loan", Ask Experian, Mar. 1, 2009. (Year: 2009).*

(Continued)

Primary Examiner — Eric T Wong
(74) Attorney, Agent, or Firm — Knobbe, Martens, Olson & Bear, LLP

(57) ABSTRACT

In one embodiment, a method includes receiving a credit inquiry for a monitored consumer. The method further includes performing at least one credit-inquiry analysis on the credit inquiry. The performing yields at least one of a matched creditor from master creditor records and an inferred credit category based on a lexical analysis. In addition, the method includes, responsive to the performing, determining whether the credit inquiry is related to a previous credit inquiry for the monitored consumer. Further, the method includes, responsive to a determination that the credit inquiry is related to a previous credit inquiry, suppressing a credit alert to the monitored consumer.

20 Claims, 11 Drawing Sheets

(56) References Cited

U.S. PATENT DOCUMENTS

| | | |
|---|---|---|
| 4,163,290 A | 7/1979 | Sutherlin et al. |
| 5,274,547 A | 12/1993 | Zoffel et al. |
| 5,323,315 A | 6/1994 | Highbloom |
| 5,414,833 A | 5/1995 | Hershey et al. |
| 5,454,030 A | 9/1995 | de Oliveira et al. |
| 5,504,675 A | 4/1996 | Cragun et al. |
| 5,563,783 A | 10/1996 | Stolfo et al. |
| 5,627,886 A | 5/1997 | Bowman |
| 5,679,940 A | 10/1997 | Templeton et al. |
| 5,696,907 A | 12/1997 | Tom |
| 5,696,965 A | 12/1997 | Dedrick |
| 5,739,512 A | 4/1998 | Tognazzini |
| 5,742,775 A | 4/1998 | King |
| 5,745,654 A | 4/1998 | Titan |
| 5,752,242 A | 5/1998 | Havens |
| 5,754,632 A | 5/1998 | Smith |
| 5,774,868 A | 6/1998 | Cragun et al. |
| 5,809,478 A | 9/1998 | Greco et al. |
| 5,819,226 A | 10/1998 | Gopinathan et al. |
| 5,819,260 A | 10/1998 | Lu et al. |
| 5,822,741 A | 10/1998 | Fischthal |
| 5,832,068 A | 11/1998 | Smith |
| 5,842,178 A | 11/1998 | Giovannoli |
| 5,870,721 A | 2/1999 | Norris |
| 5,872,921 A | 2/1999 | Zahariev et al. |
| 5,878,403 A | 3/1999 | DeFrancesco |
| 5,879,297 A | 3/1999 | Haynor et al. |
| 5,884,289 A | 3/1999 | Anderson et al. |
| 5,912,839 A | 6/1999 | Ovshinsky et al. |
| 5,913,196 A | 6/1999 | Talmor et al. |
| 5,943,666 A | 8/1999 | Kleewein et al. |
| 5,950,179 A | 9/1999 | Buchanan et al. |
| 5,987,440 A | 11/1999 | O'Neil et al. |
| 5,999,907 A | 12/1999 | Donner |
| 5,999,940 A | 12/1999 | Ranger |
| 6,023,694 A | 2/2000 | Kouchi et al. |
| 6,029,139 A | 2/2000 | Cunningham et al. |
| 6,029,149 A | 2/2000 | Dykstra et al. |
| 6,029,154 A | 2/2000 | Pettitt |
| 6,029,194 A | 2/2000 | Tilt |
| 6,044,357 A | 3/2000 | Garg |
| 6,055,570 A | 4/2000 | Nielsen |
| 6,094,643 A | 7/2000 | Anderson et al. |
| 6,119,103 A | 9/2000 | Basch et al. |
| 6,125,985 A | 10/2000 | Amdahl et al. |
| 6,142,283 A | 11/2000 | Amdahl et al. |
| 6,144,988 A | 11/2000 | Kappel |
| 6,157,707 A | 12/2000 | Baulier et al. |
| 6,182,219 B1 | 1/2001 | Feldbau et al. |
| 6,249,228 B1 | 6/2001 | Shirk et al. |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,349 B1 | 7/2001 | Aieta et al. |
| 6,282,658 B2 | 8/2001 | French et al. |
| 6,285,983 B1 | 9/2001 | Jenkins |
| 6,285,987 B1 | 9/2001 | Roth et al. |
| 6,292,795 B1 | 9/2001 | Peters et al. |
| 6,311,169 B2 | 10/2001 | Duhon |
| 6,317,783 B1 | 11/2001 | Freishtat et al. |
| 6,321,339 B1 | 11/2001 | French et al. |
| 6,330,546 B1 | 12/2001 | Gopinathan et al. |
| 6,397,197 B1 | 5/2002 | Gindlesperger |
| 6,418,436 B1 | 7/2002 | Degen et al. |
| 6,424,956 B1 | 7/2002 | Werbos |
| 6,448,389 B1 | 9/2002 | Hudson |
| 6,456,984 B1 | 9/2002 | Demoff et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,513,018 B1 | 1/2003 | Culhane |
| 6,532,459 B1 | 3/2003 | Berson |
| 6,542,894 B1 | 4/2003 | Lee et al. |
| 6,543,683 B2 | 4/2003 | Hoffman |
| 6,553,495 B1 | 4/2003 | Johansson et al. |
| 6,571,334 B1 | 5/2003 | Feldbau et al. |
| 6,597,775 B2 | 7/2003 | Lawyer et al. |
| 6,612,488 B2 | 9/2003 | Suzuki |
| 6,615,193 B1 | 9/2003 | Kingdon et al. |
| 6,658,393 B1 | 12/2003 | Basch et al. |
| 6,700,220 B2 | 3/2004 | Bayeur et al. |
| 6,714,918 B2 | 3/2004 | Hillmer et al. |
| 6,735,572 B2 | 5/2004 | Landesmann |
| 6,740,875 B1 | 5/2004 | Ishikawa et al. |
| 6,748,426 B1 | 6/2004 | Shaffer et al. |
| 6,751,626 B2 | 6/2004 | Brown et al. |
| 6,796,497 B2 | 9/2004 | Benkert et al. |
| 6,811,082 B2 | 11/2004 | Wong |
| 6,829,711 B1 | 12/2004 | Kwok et al. |
| 6,850,606 B2 | 2/2005 | Lawyer et al. |
| 6,857,073 B2 | 2/2005 | French et al. |
| 6,866,586 B2 | 3/2005 | Oberberger et al. |
| 6,871,287 B1 | 3/2005 | Ellingson |
| 6,873,979 B2 | 3/2005 | Fishman et al. |
| 6,898,574 B1 | 5/2005 | Regan |
| 6,907,408 B2 | 6/2005 | Angel |
| 6,908,030 B2 | 6/2005 | Rajasekaran et al. |
| 6,913,194 B2 | 7/2005 | Suzuki |
| 6,918,038 B1 | 7/2005 | Smith et al. |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,934,858 B2 | 8/2005 | Woodhill |
| 6,965,881 B1 | 11/2005 | Brickell et al. |
| 6,965,997 B2 | 11/2005 | Dutta |
| 6,973,462 B2 | 12/2005 | Dattero et al. |
| 6,973,575 B2 | 12/2005 | Arnold |
| 6,983,381 B2 | 1/2006 | Jerdonek |
| 6,983,882 B2 | 1/2006 | Cassone |
| 6,991,174 B2 | 1/2006 | Zuili |
| 6,993,659 B2 | 1/2006 | Milgramm et al. |
| 7,007,174 B2 | 2/2006 | Wheeler et al. |
| 7,028,052 B2 | 4/2006 | Chapman et al. |
| 7,035,855 B1 | 4/2006 | Kilger et al. |
| 7,069,240 B2 | 6/2006 | Spero et al. |
| 7,083,090 B2 | 8/2006 | Zuili |
| 7,089,592 B2 | 8/2006 | Adjaoute et al. |
| 7,092,891 B2 | 8/2006 | Maus et al. |
| 7,104,444 B2 | 9/2006 | Suzuki |
| 7,158,622 B2 | 1/2007 | Lawyer et al. |
| 7,162,640 B2 | 1/2007 | Heath et al. |
| 7,174,335 B2 | 2/2007 | Kameda |
| 7,188,078 B2 | 3/2007 | Arnett et al. |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,059 B2 | 7/2007 | Bayliss et al. |
| 7,240,363 B1 | 7/2007 | Ellingson |
| 7,246,067 B2 | 7/2007 | Austin et al. |
| 7,246,740 B2 | 7/2007 | Swift et al. |
| 7,254,560 B2 | 8/2007 | Singhal |
| 7,263,506 B2 | 8/2007 | Lee et al. |
| 7,272,728 B2 | 9/2007 | Pierson et al. |
| 7,272,857 B1 | 9/2007 | Everhart |
| 7,277,869 B2 | 10/2007 | Starkman |
| 7,277,875 B2 | 10/2007 | Serrano-Morales et al. |
| 7,283,974 B2 | 10/2007 | Katz et al. |
| 7,289,607 B2 | 10/2007 | Bhargava et al. |
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,376,618 B1 | 5/2008 | Anderson et al. |

(56) References Cited

U.S. PATENT DOCUMENTS

| | | | |
|---|---|---|---|
| 7,383,227 | B2 | 6/2008 | Weinflash et al. |
| 7,386,448 | B1 | 6/2008 | Poss et al. |
| 7,386,506 | B2 | 6/2008 | Aoki et al. |
| 7,392,534 | B2 | 6/2008 | Lu et al. |
| 7,395,273 | B2 | 7/2008 | Khan et al. |
| 7,398,915 | B1 | 7/2008 | Pineda-Sanchez et al. |
| 7,418,431 | B1 | 8/2008 | Nies et al. |
| 7,428,509 | B2 | 9/2008 | Klebanoff |
| 7,433,855 | B2 | 10/2008 | Gavan et al. |
| 7,433,864 | B2 | 10/2008 | Malik |
| 7,438,226 | B2 | 10/2008 | Helsper et al. |
| 7,444,518 | B1 | 10/2008 | Dharmarajan et al. |
| 7,457,401 | B2 | 11/2008 | Lawyer et al. |
| 7,458,508 | B1 | 12/2008 | Shao et al. |
| 7,466,235 | B1 | 12/2008 | Kolb et al. |
| 7,467,401 | B2 | 12/2008 | Cicchitto |
| 7,480,631 | B1 | 1/2009 | Merced et al. |
| 7,481,363 | B2 | 1/2009 | Zuili |
| 7,490,052 | B2 | 2/2009 | Kilger et al. |
| 7,490,356 | B2 | 2/2009 | Lieblich et al. |
| 7,497,374 | B2 | 3/2009 | Helsper et al. |
| 7,509,117 | B2 | 3/2009 | Yum |
| 7,512,221 | B2 | 3/2009 | Toms |
| 7,519,558 | B2 | 4/2009 | Ballard et al. |
| 7,522,060 | B1 | 4/2009 | Tumperi et al. |
| 7,533,808 | B2 | 5/2009 | Song et al. |
| 7,536,346 | B2 | 5/2009 | Aliffi et al. |
| 7,540,021 | B2 | 5/2009 | Page |
| 7,542,993 | B2 | 6/2009 | Satterfield et al. |
| 7,543,739 | B2 | 6/2009 | Brown et al. |
| 7,543,740 | B2 | 6/2009 | Greene et al. |
| 7,546,271 | B1 | 6/2009 | Chmielewski et al. |
| 7,548,886 | B2 | 6/2009 | Kirkland et al. |
| 7,552,467 | B2 | 6/2009 | Lindsay |
| 7,562,184 | B2 | 7/2009 | Henmi et al. |
| 7,562,814 | B1 | 7/2009 | Shao et al. |
| 7,568,616 | B2 | 8/2009 | Zuili |
| 7,575,157 | B2 | 8/2009 | Barnhardt et al. |
| 7,580,884 | B2 | 8/2009 | Cook |
| 7,581,112 | B2 | 8/2009 | Brown et al. |
| 7,584,146 | B1 | 9/2009 | Duhon |
| 7,587,368 | B2 | 9/2009 | Felsher |
| 7,591,425 | B1 | 9/2009 | Zuili et al. |
| 7,593,891 | B2 | 9/2009 | Kornegay et al. |
| 7,606,401 | B2 | 10/2009 | Hoffman et al. |
| 7,606,790 | B2 | 10/2009 | Levy |
| 7,610,216 | B1 | 10/2009 | May et al. |
| 7,610,229 | B1 | 10/2009 | Kornegay |
| 7,610,243 | B2 | 10/2009 | Haggerty et al. |
| 7,620,596 | B2 | 11/2009 | Knudson et al. |
| 7,623,844 | B2 | 11/2009 | Herrmann et al. |
| 7,630,924 | B1 | 12/2009 | Collins et al. |
| 7,630,932 | B2 | 12/2009 | Danaher et al. |
| 7,636,853 | B2 | 12/2009 | Cluts et al. |
| 7,644,868 | B2 | 1/2010 | Hare |
| 7,647,344 | B2 | 1/2010 | Skurtovich, Jr. et al. |
| 7,647,645 | B2 | 1/2010 | Edeki et al. |
| 7,653,593 | B2 | 1/2010 | Zarikian et al. |
| 7,657,431 | B2 | 2/2010 | Hayakawa |
| 7,668,769 | B2 | 2/2010 | Baker et al. |
| 7,668,840 | B2 | 2/2010 | Bayliss et al. |
| 7,668,921 | B2 | 2/2010 | Proux et al. |
| 7,672,865 | B2 | 3/2010 | Kumar et al. |
| 7,673,793 | B2 | 3/2010 | Greene et al. |
| 7,676,418 | B1 | 3/2010 | Chung et al. |
| 7,676,433 | B1 | 3/2010 | Ross et al. |
| 7,685,096 | B2 | 3/2010 | Margolus et al. |
| 7,686,214 | B1 | 3/2010 | Shao et al. |
| 7,689,007 | B2 | 3/2010 | Bous et al. |
| 7,689,505 | B2 | 3/2010 | Kasower |
| 7,689,506 | B2 | 3/2010 | Fei et al. |
| 7,690,032 | B1 | 3/2010 | Peirce |
| 7,701,364 | B1 | 4/2010 | Zilberman |
| 7,702,550 | B2 | 4/2010 | Perg et al. |
| 7,707,163 | B2 | 4/2010 | Anzalone et al. |
| 7,708,190 | B2 | 5/2010 | Brandt et al. |
| 7,708,200 | B2 | 5/2010 | Helsper et al. |
| 7,711,635 | B2 | 5/2010 | Steele et al. |
| 7,711,636 | B2 | 5/2010 | Robida et al. |
| 7,720,750 | B2 | 5/2010 | Brody |
| 7,725,300 | B2 | 5/2010 | Pinto et al. |
| 7,734,523 | B1 | 6/2010 | Cui et al. |
| 7,735,125 | B1 | 6/2010 | Alvarez et al. |
| 7,742,982 | B2 | 6/2010 | Chaudhuri et al. |
| 7,747,520 | B2 | 6/2010 | Livermore et al. |
| 7,747,521 | B2 | 6/2010 | Serio |
| 7,747,559 | B2 | 6/2010 | Leitner et al. |
| 7,752,084 | B2 | 7/2010 | Pettitt |
| 7,752,236 | B2 | 7/2010 | Williams et al. |
| 7,752,554 | B2 | 7/2010 | Biggs et al. |
| 7,756,783 | B2 | 7/2010 | Crooks |
| 7,761,379 | B2 | 7/2010 | Zoldi et al. |
| 7,761,384 | B2 | 7/2010 | Madhogarhia |
| 7,774,270 | B1 | 8/2010 | MacCloskey |
| 7,778,885 | B1 | 8/2010 | Semprevivo et al. |
| 7,779,456 | B2 | 8/2010 | Dennis et al. |
| 7,779,457 | B2 | 8/2010 | Taylor |
| 7,783,515 | B1 | 8/2010 | Kumar et al. |
| 7,788,184 | B2 | 8/2010 | Kane |
| 7,792,715 | B1 | 9/2010 | Kasower |
| 7,792,864 | B1 | 9/2010 | Rice et al. |
| 7,793,835 | B1 | 9/2010 | Coggeshail et al. |
| 7,801,811 | B1 | 9/2010 | Merrell et al. |
| 7,801,828 | B2 | 9/2010 | Candella et al. |
| 7,802,104 | B2 | 9/2010 | Dickinson |
| 7,805,362 | B1 | 9/2010 | Merrell et al. |
| 7,805,391 | B2 | 9/2010 | Friedlander et al. |
| 7,813,944 | B1 | 10/2010 | Luk et al. |
| 7,827,115 | B2 | 11/2010 | Weller et al. |
| 7,832,006 | B2 | 11/2010 | Chen et al. |
| 7,835,983 | B2 | 11/2010 | Lefner et al. |
| 7,840,459 | B1 | 11/2010 | Loftesness et al. |
| 7,841,004 | B1 | 11/2010 | Balducci et al. |
| 7,844,520 | B1 | 11/2010 | Franklin |
| 7,848,987 | B2 | 12/2010 | Haig |
| 7,849,029 | B2 | 12/2010 | Crooks et al. |
| 7,853,518 | B2 | 12/2010 | Cagan |
| 7,853,526 | B2 | 12/2010 | Milana |
| 7,853,533 | B2 | 12/2010 | Eisen |
| 7,853,998 | B2 | 12/2010 | Blaisdell et al. |
| 7,856,397 | B2 | 12/2010 | Whipple et al. |
| 7,856,494 | B2 | 12/2010 | Kulkarni |
| 7,860,769 | B2 | 12/2010 | Benson |
| 7,860,783 | B2 | 12/2010 | Yang et al. |
| 7,865,427 | B2 | 1/2011 | Wright et al. |
| 7,865,439 | B2 | 1/2011 | Seifert et al. |
| 7,865,937 | B1 | 1/2011 | White et al. |
| 7,870,078 | B2 | 1/2011 | Clark et al. |
| 7,870,599 | B2 | 1/2011 | Pemmaraju |
| 7,874,488 | B2 | 1/2011 | Parkinson |
| 7,877,304 | B1 | 1/2011 | Coulter |
| 7,877,784 | B2 | 1/2011 | Chow et al. |
| 7,882,548 | B2 | 2/2011 | Heath et al. |
| 7,890,433 | B2 | 2/2011 | Singhal |
| 7,904,360 | B2 | 3/2011 | Evans |
| 7,904,367 | B2 | 3/2011 | Chung et al. |
| 7,908,242 | B1 | 3/2011 | Achanta |
| 7,909,246 | B2 | 3/2011 | Hogg et al. |
| 7,912,865 | B2 | 3/2011 | Akerman et al. |
| 7,917,715 | B2 | 3/2011 | Tallman, Jr. |
| 7,925,582 | B1 | 4/2011 | Kornegay et al. |
| 7,929,951 | B2 | 4/2011 | Stevens et al. |
| 7,933,835 | B2 | 4/2011 | Keane et al. |
| 7,941,363 | B2 | 5/2011 | Tanaka et al. |
| 7,945,515 | B2 | 5/2011 | Zoldi et al. |
| 7,950,577 | B1 | 5/2011 | Daniel |
| 7,958,046 | B2 | 6/2011 | Doerner et al. |
| 7,961,857 | B2 | 6/2011 | Zoldi et al. |
| 7,962,404 | B1 | 6/2011 | Metzger, II et al. |
| 7,962,467 | B2 | 6/2011 | Howard et al. |
| 7,970,679 | B2 | 6/2011 | Kasower |
| 7,970,698 | B2 | 6/2011 | Gupta et al. |
| 7,970,701 | B2 | 6/2011 | Lewis et al. |
| 7,971,246 | B1 | 6/2011 | Emigh et al. |

(56) References Cited

U.S. PATENT DOCUMENTS

| | | |
|---|---|---|
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,578 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,513 B2 | 10/2012 | Coulter |
| 8,285,613 B1 * | 10/2012 | Coulter ............... G06Q 40/00 705/35 |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,468,090 B2 | 6/2013 | Lesandro et al. |
| 8,489,479 B2 | 7/2013 | Slater et al. |
| 8,510,329 B2 | 8/2013 | Balkir et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,725,613 B1 | 5/2014 | Celka et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,918,891 B2 | 12/2014 | Coggeshall et al. |
| 8,949,981 B1 | 2/2015 | Trollope et al. |
| 9,118,646 B2 | 8/2015 | Pierson et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,773,227 B2 | 9/2017 | Zoldi et al. |
| 9,953,321 B2 | 4/2018 | Zoldi et al. |
| 10,043,213 B2 | 8/2018 | Straub et al. |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 10,438,308 B2 | 10/2019 | Prichard et al. |
| 2001/0014868 A1 | 8/2001 | Herz et al. |
| 2001/0014878 A1 | 8/2001 | Mitra et al. |

(56) References Cited

U.S. PATENT DOCUMENTS

| | | |
|---|---|---|
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0254868 A1 | 12/2004 | Kirkland et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0050577 A1 | 3/2005 | Westbrook et al. |
| 2005/0058262 A1 | 3/2005 | Timmins et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0138391 A1 | 5/2005 | Mandalia et al. |
| 2005/0125226 A1 | 6/2005 | Magee |
| 2005/0125686 A1 | 6/2005 | Brandt |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0273442 A1 | 12/2005 | Bennett et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004663 A1 | 1/2006 | Singhal |

(56) References Cited

U.S. PATENT DOCUMENTS

| | | |
|---|---|---|
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100719 A1 | 5/2007 | Chwast et al. |
| 2007/0100774 A1 | 5/2007 | Abdon |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1* | 9/2007 | Rivette .................. G06Q 10/10 705/59 |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1* | 1/2008 | Grant .................. G06Q 20/102 705/44 |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |

(56) References Cited

U.S. PATENT DOCUMENTS

| | | |
|---|---|---|
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0140576 A1 | 6/2008 | Lewis et al. |
| 2008/0147454 A1 | 6/2008 | Walker et al. |
| 2008/0154758 A1 | 6/2008 | Schattmaier et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1* | 2/2009 | Celano .............. G06Q 40/00 705/35 |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0182653 A1 | 7/2009 | Zimiles |
| 2009/0199264 A1 | 8/2009 | Lang |
| 2009/0204457 A1 | 8/2009 | Buhrmann et al. |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Asianian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0158207 A1 | 6/2010 | Dhawan et al. |
| 2010/0159210 A1 | 7/2010 | Bous et al. |
| 2010/0159947 A1 | 7/2010 | Sarmah et al. |
| 2010/0188684 A1 | 7/2010 | Kumara |

(56) References Cited

U.S. PATENT DOCUMENTS

| | | |
|---|---|---|
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030080 A1 | 2/2012 | Slater et al. |
| 2012/0030083 A1 | 2/2012 | Newman et al. |
| 2012/0030771 A1 | 2/2012 | Pierson et al. |
| 2012/0066073 A1* | 3/2012 | Dilip ............... G06Q 30/0269 705/14.66 |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0215758 A1 | 8/2012 | Gottschalk, Jr. et al. |
| 2012/0278227 A1 | 11/2012 | Kolo et al. |
| 2012/0290660 A1 | 11/2012 | Rao et al. |
| 2013/0004033 A1 | 1/2013 | Trugenberger |
| 2013/0185293 A1 | 7/2013 | Boback |
| 2013/0218797 A1 | 8/2013 | Prichard et al. |
| 2014/0007238 A1 | 1/2014 | Magee et al. |
| 2014/0058910 A1 | 2/2014 | Abeles |
| 2014/0149304 A1 | 5/2014 | Bucholz et al. |
| 2015/0186901 A1 | 7/2015 | Miltonberger |
| 2015/0199784 A1 | 7/2015 | Straub et al. |
| 2015/0295924 A1 | 10/2015 | Gottschalk, Jr. |
| 2016/0012561 A1 | 1/2016 | Lappenbusch et al. |
| 2016/0063645 A1 | 3/2016 | Houseworth et al. |
| 2016/0071208 A1 | 3/2016 | Straub et al. |
| 2016/0086262 A1 | 3/2016 | Straub et al. |
| 2016/0328814 A1 | 11/2016 | Prichard et al. |
| 2016/0344758 A1 | 11/2016 | Cohen et al. |
| 2017/0053369 A1 | 2/2017 | Gottschalk, Jr. et al. |
| 2017/0099314 A1 | 4/2017 | Klatt et al. |
| 2017/0278182 A1 | 9/2017 | Kasower |
| 2017/0287065 A1 | 10/2017 | Samler et al. |
| 2017/0374076 A1 | 12/2017 | Pierson et al. |
| 2018/0130157 A1 | 5/2018 | Gottschalk, Jr. et al. |
| 2018/0322572 A1 | 11/2018 | Straub et al. |

FOREIGN PATENT DOCUMENTS

| | | |
|---|---|---|
| EP | 0 554 083 | 8/1993 |
| GB | 2 392 748 | 3/2004 |
| GB | 2 518 099 | 3/2015 |
| KR | 10-2004-0034063 | 4/2004 |
| TW | 256569 | 6/2006 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 02/027610 | 4/2002 |
| WO | WO 03/071388 | 4/2002 |
| WO | WO 02/097563 | 12/2002 |
| WO | WO 94/006103 | 3/2004 |
| WO | WO 02/037219 A9 | 5/2004 |
| WO | WO 2004/046882 | 6/2004 |
| WO | WO 2006/069199 | 6/2006 |
| WO | WO 2007/106393 | 9/2007 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2012/054646 | 9/2009 |
| WO | WO 2011/044036 | 4/2011 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |

OTHER PUBLICATIONS

Quinn, Tom, "How Credit Inquiries Affect Your Credit Score", May 2, 2011. (Year: 2011).*

Experian Team, "Impact on Credit Scores of Inquiries for an Auto Loan," Ask Experian, Mar. 1, 2009, pp. 5.

Quinn, Tom, "Low Credit Inquiries Affect Your Credit Score", Credit.com, May 2, 2011, pp. 2.

U.S. Appl. No. 09/557,252, filed Apr. 24, 2000, Page.

"Fraud Alert I Learn How". Fight Identity Theft. http://www.fightidentitytheft.com/flag.html, accessed on Nov. 5, 2009.

LifeLock, "Personal Identity Theft Protection & Identity Theft Products," http://www.lifelock.com/lifelock-for-people, accessed Nov. 5, 2007.

TheMorningCall.Com, "Cheap Ways to Foil Identity Theft," www.mcall.com/business/columnists/all-karp.5920748jul01.0 . . . , published Jul. 1, 2007.

International Search Report and Written Opinion for Application No. PCT/US2007/06070, dated Nov. 10, 2008.

International Search Report and Written Opinion for Application No. PCT/US2008/064594, dated Oct. 30, 2008.

International Preliminary Report and Written Opinion in PCT/US2008/064594, dated Dec. 10, 2009.

International Search Report and Written Opinion for Application No. PCT/US09/37565, dated May 12, 2009.

Official Communication in Australian Patent Application No. 2012217565, dated May 12, 2017.

Official Communication in Canadian Patent Application No. 2,827,478, dated Jun. 29, 2017.

(56) References Cited

OTHER PUBLICATIONS

Official Communication in Canadian Patent Application No. 2,827,478, dated May 31, 2018.
Extended European Search Report for Application No. EP12747205, dated Sep. 25, 2014.
Supplementary European Search Report for Application No. EP12747205, dated Jun. 19, 2015.
Extended European Search Report for Application No. EP18207755, dated Dec. 13, 2018.
International Search Report and Written Opinion for Application No. PCT/US2012/025456, dated May 21, 2012.
International Preliminary Report on Patentability in Application No. PCT/US2012/025456, dated Aug. 21, 2013.
International Search Report and Written Opinion for Application No. PCT/US2011/033940, dated Aug. 22, 2011.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
AAD et al., "NRC Data Collection and the Privacy by Design Principles", IEEE, Nov. 2010, pp. 5.
"Arizona Company Has Found Key in Stopping ID Theft," PR Newswire, New York, Aug. 10, 2005 http://proguest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
Anonymous, "Feedback", Credit Management, ABI/INFORM Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.biuecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
EFunds Corporation, "Data & Decisioning: Debit Report" printed Apr. 1, 2007, http://www.efunds.com/web/industry-solutions/financial-services/frm-debit-report/htm in 1 page.
Equifax; "Equifax Credit Watch"; https://www.econsumer.equifax.co.uk/consumer/uk/sitepage.ehtml, dated Jun. 27, 2007 on www.archive.org.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.

"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fail 1981, vol. 19, No. 3, p. 319.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Haglund, Christoffer, "Two-Factor Authentication With a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 45, No. 5, pp. 53-58.
"ID Analytics ID Network", from www.idanalytics.com, as retrieved from Internet Archive, dated Nov. 20, 2005 or earlier; attached as "ID Network (IDNb)".
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proguest.umi.com/pqdweb?did=852869731&sid=1&Fmt=3&clientId=19649&RQT=309&Vname<PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20030706135451/http://iboainfo.com/child-order.htmi as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)".
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservablesKarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5603072/how-americas-broken-tax-system-makes-identity-theft-easy, Apr. 14, 2014, pp. 10.

(56) References Cited

OTHER PUBLICATIONS

Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
My Call Credit http://www.mycalicredit.com/products.asp?product=ALR dated Dec. 10, 2005 on www.archive.org.
My Call Credit http://www.mycallcredit.com/rewrite.asp?display-faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs,wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 6, 2012 in 1 page.
Planet Receipt—Solutions & Features, http://www.planetreceipt.com/solutions-features printed Oct. 16, 2012 in 2 pages.

Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Rivera, Barbara, "New Tools for Combating Income Tax Refund Fraud", https://gcn.com/Articles/2014/05/08/Insight-tax-fraud-tools.aspx?Page-1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
ShoeBoxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Webpage printed out from http://www.jpmorgan.com/cm/ContentServer?cz=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
Official Communication in Australian Patent Application No. 2017203586, dated Jun. 18, 2019.
Official Communication in Canadian Patent Application No. 2,827,478, dated Mar. 27, 2019.
U.S. Appl. No. 13/828,566, U.S. Pat. No. 8,812,387, System and Method for Identifying Related Credit Inquiries, filed Mar. 14, 2013.
U.S. Appl. No. 14/323,751, U.S. Pat. No. 9,595,066, System and Method for Identifying Related Credit Inquiries, filed Jul. 3, 2014.

\* cited by examiner

SYSTEM AND METHOD FOR IDENTIFYING RELATED CREDIT INQUIRIES

CROSS-REFERENCE TO RELATED APPLICATIONS

This patent application is a continuation of U.S. patent application Ser. No. 14/323,751, filed on Jul. 3, 2014, entitled SYSTEM AND METHOD FOR IDENTIFYING RELATED CREDIT INQUIRIES, which is a continuation of U.S. application Ser. No. 13/828,566, which is patented as U.S. Pat. No. 8,812,387, entitled SYSTEM AND METHOD FOR IDENTIFYING RELATED CREDIT INQUIRIES, filed on Mar. 14, 2013, both of which are hereby incorporated by reference herein in their entirety.

BACKGROUND

Technical Field

The present invention relates generally to data analysis and more particularly, but not by way of limitation, to systems and methods for identifying related credit inquiries.

History of Related Art

Identity theft is one of the fastest-growing crimes in the United States and worldwide. Identity theft generally involves a use of personally-identifying information (PII) that is not authorized by an owner of the PII. PII, as used herein, refers to information that can be used to uniquely identify, contact, or locate a person or can be used with other sources to uniquely identify, contact, or locate a person. PII may include, but is not limited to, social security numbers (SSN), bank or credit card account numbers, passwords, birth dates, and addresses. Identity theft may include, for example, an unauthorized change to PII or an unauthorized use of PII to access resources or to obtain credit or other benefits.

Since identity theft affects both businesses and consumers, there is a need to effectively alert consumers of potential identity theft. Part of an effective alert system can be notifying consumers of new credit inquiries using their PII. In that regard, various credit-monitoring services generate and present alerts to monitored consumers as new credit inquiries appear on their credit report. However, in jurisdictions such as the United States, distinct credit reports are maintained by multiple credit bureaus. Therefore, when the monitored consumer begins shopping for a car loan, home mortgage, credit card, or the like, multiple credit inquiries may be initiated by multiple creditors relative to multiple credit reports. This can result in voluminous credit alerts being generated and presented to the monitored consumer even though the alerts may relate to a single prospective transaction. The volume of redundant information can reduce the effectiveness of credit monitoring, for example, by training consumers to ignore alerts or by discouraging them from monitoring their credit at all.

SUMMARY OF THE INVENTION

In one embodiment, a method includes, on a computer system comprising at least on processor and memory, receiving a credit inquiry for a monitored consumer. The method further includes performing, by the computer system, at least one credit-inquiry analysis on the credit inquiry. The performing yields at least one of a matched creditor from master creditor records and an inferred credit category based on a lexical analysis. In addition, the method includes, responsive to the performing, the computer system determining whether the credit inquiry is related to a previous credit inquiry for the monitored consumer. Further, the method includes, responsive to a determination that the credit inquiry is related to a previous credit inquiry, the computer system suppressing a credit alert to the monitored consumer.

In one embodiment, a system includes at least one processor operable to implement a method. The method includes receiving a credit inquiry for a monitored consumer. The method further includes performing at least one credit-inquiry analysis on the credit inquiry. The performing yields at least one of a matched creditor from master creditor records and an inferred credit category based on a lexical analysis. In addition, the method includes, responsive to the performing, determining whether the credit inquiry is related to a previous credit inquiry for the monitored consumer. Further, the method includes, responsive to a determination that the credit inquiry is related to a previous credit inquiry, suppressing a credit alert to the monitored consumer.

In one embodiment, a computer-program product includes a computer-usable medium having computer-readable program code embodied therein. The computer-readable program code adapted to be executed to implement a method. The method includes receiving a credit inquiry for a monitored consumer. The method further includes performing at least one credit-inquiry analysis on the credit inquiry. The performing yields at least one of a matched creditor from master creditor records and an inferred credit category based on a lexical analysis. In addition, the method includes, responsive to the performing, determining whether the credit inquiry is related to a previous credit inquiry for the monitored consumer. Further, the method includes, responsive to a determination that the credit inquiry is related to a previous credit inquiry, suppressing a credit alert to the monitored consumer.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, systems and methods described herein can be leveraged to identify and group together credit inquiries that relate to a same credit category and/or a same creditor. In this fashion, the volume of credit alerts that are presented to monitored consumers can be reduced in a controlled manner.

For purposes of this patent application, a credit inquiry refers to an attempt to obtain information from a consumer's credit file. A creditor, as used herein, refers to one who initiates a credit inquiry. For example, a creditor may initiate a credit inquiry in connection with evaluating a consumer's credit-worthiness. As described in greater detail below a credit inquiry generally relates to a credit category. A credit category, as used herein, refers to a classification of a credit product to which a given credit inquiry relates. For example, in various embodiments, credit categories can includes automobile loans, home mortgages, revolving lines of credit such as credit cards, apartment rentals, and the like.

A monitored consumer, as used herein, refers to a consumer whose credit file is being monitored, for example, by an identity or credit-monitoring system. An identity or credit-monitoring system may monitor consumers' credit, for example, as a subscription-based service. Therefore, monitored consumers may receive periodic alerts, for example, as new credit inquiries appear in their credit file.

Figure 1:
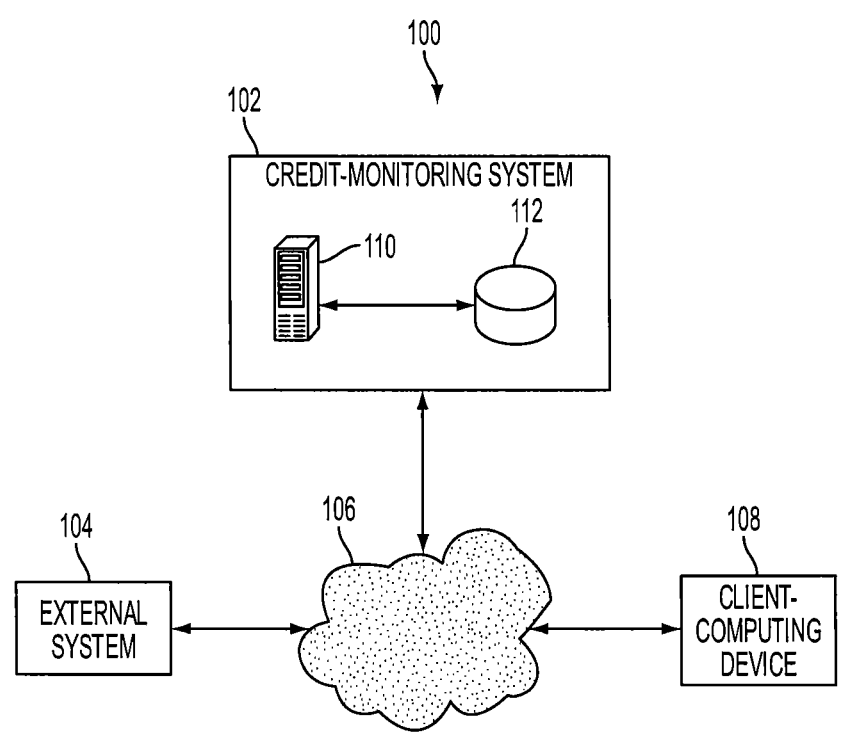
FIG. 1 illustrates a system that can be used to identify related credit inquiries.

FIG. 1 illustrates a system 100 that can be used to identify related credit inquiries. The system 100 includes a credit-monitoring system 102, one or more external systems 104, and one or more client-computing devices 108. The credit-monitoring system 102 includes at least one server computer 110 communicably coupled to one or more databases 112. The credit-monitoring system 102 is operable to communicate with the one or more external systems 104 and the one or more client-computing devices 108 over a network 106.

The credit-monitoring system 102 is shown to include the at least one server computer 110 and the one or more databases 112 for illustrative purposes. One of ordinary skill in the art will appreciate that each instance of a computer such as, for example, the at least one server computer 110, may be representative of any number of physical or virtual server computers. Likewise, each instance of a database such as, for example, the one or more databases 112, may be representative of a plurality of databases. Moreover, each instance of a system such as, for example, the credit-monitoring system 102 and the one or more external systems 104, may be representative of any combination of computing equipment including, for example, any number of physical or virtual server computers and any number and organization of databases. In addition, it should be appreciated that, in various embodiments, the network 106 can be viewed as an abstraction of multiple distinct networks via which the credit-monitoring system 102 is operable to communicate. For example, the network 106 can include one or multiple communication networks such as, for example, public or private intranets, a public switch telephone network (PSTN), a cellular network, the Internet, or the like.

In a typical embodiment, the credit-monitoring system 102, via the at least one server computer 110, provides credit-monitoring services to monitored consumers. In particular, the credit-monitoring system 102 is operable to identify suspicious events related to the monitored consumers' personally identifying information (PII), determine whether credit alerts are merited, and generate and deliver such credit alerts when deemed merited. A suspicious event can include, for example, a new credit inquiry appearing in a given monitored consumer's credit file. Information about identified suspicious events, monitored consumers, and each monitored consumer's credit file is typically stored in the one or more databases 112.

The one or more client-computing devices 108 are computer systems used by the monitored consumers, for example, to view or receive credit alerts. The one or more client-computing devices 108 can include, for example, desktop computers, laptop computers, tablet computers, smart phones, PSTN telephones, cellular phones, and the like. The monitored consumers are typically enrollees of the credit-monitoring system 102. Enrollees are generally individuals who have registered with the credit-monitoring system 102 and have passed applicable security prerequisites for enrollment such as, for example, an identity-verification process.

The one or more external systems 104 are representative of computer systems from which the credit-monitoring system 102 is operable to receive information about the monitored consumers' credit files. For example, the one or more external systems 104 may each be associated with a credit bureau and be operable to provide information about the monitored consumers' credit files via, for example, an application programming interface (API).

Example of identity and/or credit-monitoring systems that can be included as part of the credit-monitoring system 102 are described in U.S. Pat. No. 8,359,278 and in U.S. patent application Ser. Nos. 13/093,664, 13/398,471, and 12/780,130. In addition, U.S. patent application Ser. No. 13/093,664 describes how monitored consumers can enroll for credit monitoring and how identity alerts such as, for example, credit alerts, can be generated and presented to the monitored consumers. U.S. Pat. No. 8,359,278 and U.S. patent application Ser. Nos. 13/093,664, 13/398,471, and 12/780,130 are hereby incorporated by reference.

In operation, the credit-monitoring system 102 monitors the credit files of the monitored consumers via information received from the one or more external systems 104. As necessary, the credit-monitoring system 102 generates and delivers credit alerts to appropriate monitored consumers via the one or more client-computing devices 108. In a typical embodiment, the credit-monitoring system 102 is operable to identify credit alerts that are related so that credit alerts deemed redundant or unnecessary can be suppressed (i.e., not presented to a given monitored consumer). In various embodiments, the credit-monitoring system 102 may allow the monitored consumers to configure the extent to which credit alerts deemed related should be suppressed. FIGS. 2-11 describe examples of methods that can be implemented by the credit-monitoring system 102 to identify related credit inquiries.

Figure 2:
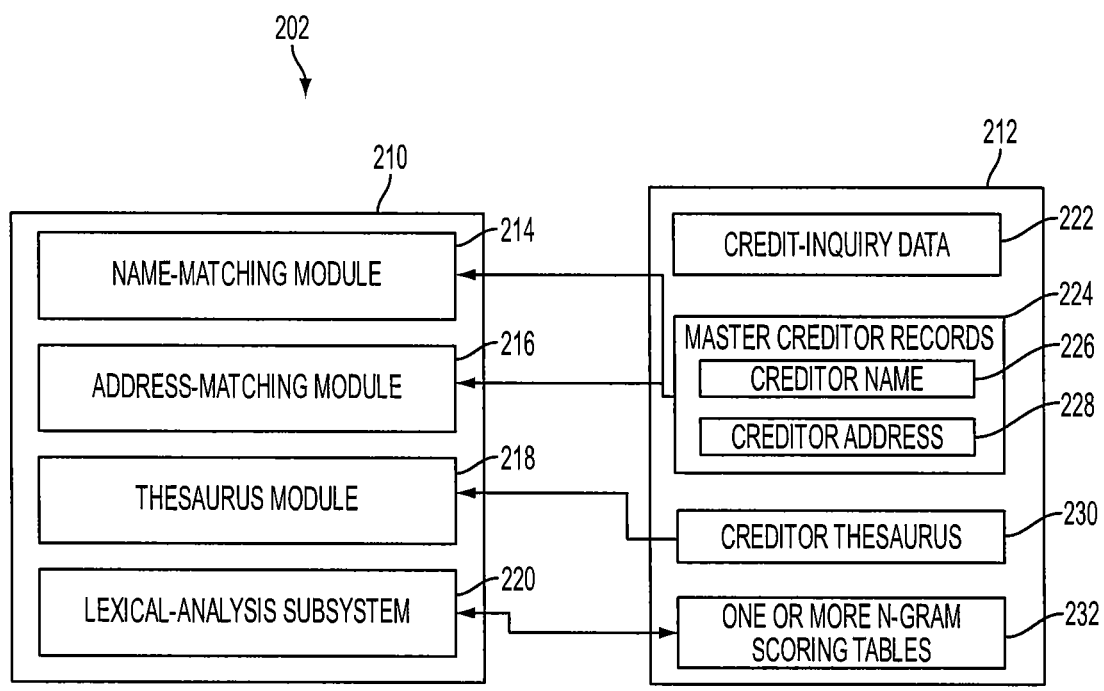
FIG. 2 illustrates exemplary software components and data of a credit-monitoring system.

FIG. 2 illustrates exemplary software components and data of a credit-monitoring system 202. The credit-monitoring system 202 includes at least one server computer 210 and one or more databases 212. In a typical embodiment, the credit-monitoring system 202, the at least one server computer 210, and the one or more databases 212 operate as described with respect to the credit-monitoring system 102, the at least one server computer 110, and the one or more databases 112, respectively, of FIG. 1.

The at least one server computer 210 has resident and executing thereon a name-matching module 214, an address-matching module 216, a thesaurus module 218, and a lexical-analysis subsystem 220. As described in greater detail below, the name-matching module 214, the address-matching module 216, the thesaurus module 218, and the lexical-analysis subsystem 220 are each an example of a credit-inquiry analysis that may be performed by the at least one server computer 210.

The one or more databases 212 are operable to store, inter alia, credit-inquiry data 222, master creditor records 224, a creditor thesaurus 230, and one or more n-gram scoring tables 232. In various embodiments, the one or more n-gram storing tables may instead be stored in a flat file rather than in the one or more databases 212 as illustrated. The credit-inquiry data 222 corresponds to information regarding credit inquiries that have appeared in credit files of monitored consumers. In a typical embodiment, the credit-inquiry data 222 is received via one or more external systems such as, for example, the one or more external systems 104 in FIG. 1.

The master creditor records 224 correspond to a master list of known creditors. For each known creditor listed therein, the master creditor records 224 typically include a creditor name 226 and a creditor address 228. The creditor name 226 is typically a canonical creditor name, i.e., a primary name by which a particular creditor is known. Therefore, the master creditor records 224 are operable to serve, inter alia, as a master name list and a master address list. In addition, the master creditor records 224 typically associates at least a portion of the creditors listed therein with one or more credit categories. In various embodiments, some creditors' activities may be so expansive that it is not practical to label those creditors as doing business relative to particular credit categories. In these cases, the master creditor records 224 may not associated such creditors with any specific credit categories.

The creditor thesaurus 230 stores a list of alternative names (i.e., synonyms) for each of a least a portion of the creditors represented in the master creditor records 224. In particular, for each creditor represented therein, the creditor thesaurus 230 maps the list of alternative names to the creditor name 226). The one or more n-gram scoring tables 232 store information generated and used by the lexical analysis subsystem 220. The one or more n-gram scoring tables 232 will be described in greater detail below with respect to the lexical-analysis subsystem 220.

In a typical embodiment, the name-matching module 214 is a software module that attempts to compare a provided creditor name with the master name list maintained by the master creditor records 224. In a typical embodiment, the name-matching module 214 returns any creditors from the master creditor records 224 whose name is deemed to match the provided creditor name. Exemplary operation of the name-matching module 214 will be described with respect to FIG. 3.

In a typical embodiment, the address-matching module 216 is a software module that attempts to compare a provided creditor address with the master address list maintained by the master creditor records 224. In a typical embodiment, the address-matching module 216 returns any creditors from the master creditor records 224 whose address is deemed to match the provided creditor address. Exemplary operation of the address-matching module will be described with respect to FIGS. 4A-4B.

In a typical embodiment, the thesaurus module 218 is a software module that attempts to compare a provided creditor name with the creditor thesaurus 230. In a typical embodiment, the thesaurus modules 218 returns any creditors whose alternative name from the creditor thesaurus 230 is deemed to match the provided creditor name. The thesaurus module 218 is generally most effective for creditors that are larger an considered more stable. Smaller, less stable creditors are generally more subject to frequent name changes (e.g., due to merger-and-acquisition activity). Frequent name changes can lead to an undesirable level of manual maintenance of the creditor thesaurus 230. Therefore, in various embodiments, the creditor thesaurus 230 may only maintain alternative names for creditors that are deemed most stable. Exemplary operation of the thesaurus module 218 will be described with respect to FIG. 5.

In a typical embodiment, the lexical-analysis subsystem 220 analyzes sequences of n words (referred to herein as "n-grams") that appear in creditor names (hereinafter, "creditor-name n-grams"). For purposes of this patent application, each distinct value of n refers to a distinct n-gram type. For example, a sequence of one word refers to an n-gram type of unigram. By way of further example, a sequence of two words refers to an n-gram type of bigram. In various embodiments, the lexical-analysis subsystem 220 may be utilized to analyze multiple types of n-grams such as, for example, unigrams and bigrams. The lexical-analysis subsystem 220 is typically intended to operate successfully on the creditor names a priori. For example, while the thesaurus module 218 may require frequent updates to effectively deal with unstable creditors, the lexical-analysis subsystem 220 can be effective in such situation without a need for frequent updates.

In a typical embodiment, for a given type of n-gram, the lexical analysis subsystem 220 identifies each n-gram of the given type within the master name list of the master creditor records 224. The lexical analysis subsystem 220 then scores the extent to which each identified n-gram is indicative of a plurality of credit categories. In a typical embodiment, the lexical-analysis subsystem 220 stores the scores in the one or more n-gram scoring tables 232. In various embodiments, the one or more n-gram scoring tables 232 can include a distinct table for each type of n-gram for which scores are generated. In various other embodiments, the one or more n-gram scoring tables 232 can store all n-grams in a single table regardless of n-gram type.

Based on the one or more n-gram scoring tables 232, the lexical-analysis subsystem 220 can analyze n-grams of a same type that appear within a provided creditor name (e.g., from a credit inquiry). The lexical-analysis subsystem 220 is operable to infer a credit category from the analyzed n-grams and return the inferred credit category. Exemplary operation of the lexical-analysis subsystem 220 will be described with respect to FIGS. 7-8.

In various embodiments, the name-matching module 214, the address-matching module 216, the thesaurus module 218, and the lexical-analysis subsystem 220 may be used individually to analyze credit inquiries. In various other embodiments, the name-matching module 214, the address-matching module 216, the thesaurus module 218, and the lexical-analysis subsystem 220 may be used in various advantageous combinations to analyze credit inquiries. Examples of how the name-matching module 214, the address-matching module 216, the thesaurus module 218, and the lexical-analysis subsystem 220 may be utilized in combination will be described with respect to FIGS. 9-10.

Although the name-matching module 214, the address-matching module 216, the thesaurus module 218, and the lexical-analysis subsystem 220 are depicted as separate software components, in various other embodiments, such software components are organized differently. For example, the name-matching module 214, the address-matching module 216, the thesaurus module 218, and the lexical-analysis subsystem 220 could be merged into a single software component, each be further divided into other software components, or have their collective functionality allocated differently among any number of software components.

Figure 3:
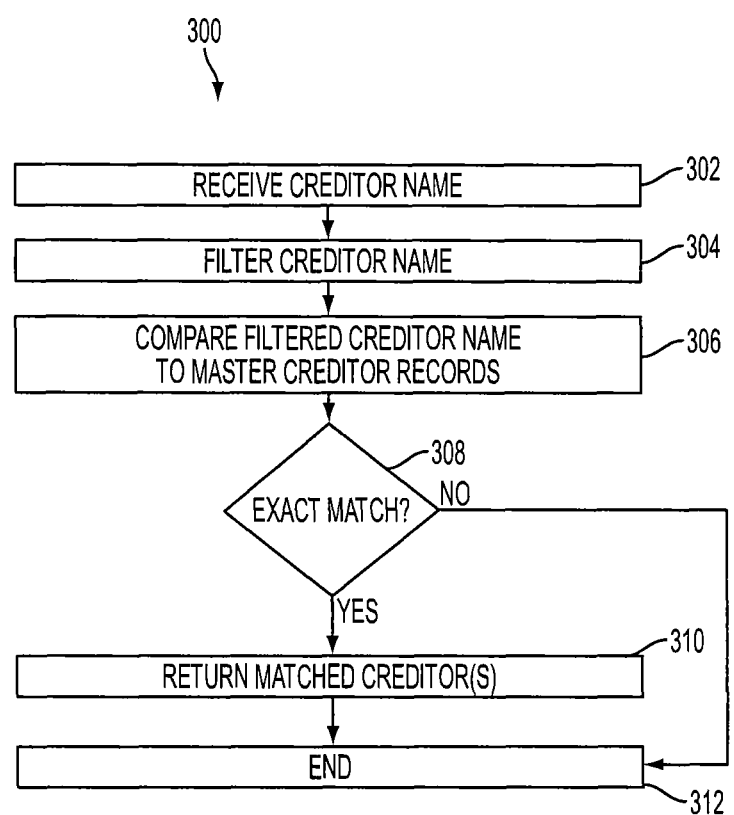
FIG. 3 illustrates a process for name matching.

FIG. 3 illustrates a process 300 for name matching that may be performed by a name-matching module such as, for example, the name-matching module 214 of FIG. 2. The name-matching module is resident and executing on a server computer such as, for example, the at least one server computer 110 of FIG. 1 or the at least one server computer 210 of FIG. 2. The process 300 begins at step 302.

At step 302, the name-matching module receives a creditor name. In a typical embodiment, the creditor name has been extracted from a credit inquiry as part of credit monitoring of a monitored consumer. From step 302, the process 300 proceeds to step 304. At step 304, the name-matching module filters the creditor name to remove, for example, multiple contiguous spaces and punctuation. In various embodiments, the name-matching module may also filter the creditor name to remove words deemed to be noise words such as, for example, "the," "and," and the like. From the step 304, the process 300 proceeds to step 306.

At step 306, the name-matching module compares the filtered creditor name to a filtered version of each creditor name in master creditor records such as, for example, the master creditor records 224 of FIG. 2. In various embodiments, the master creditor records maintain a filtered version of each creditor name in the master creditor records. In these embodiments, no computation of the filtered version needs to occur. In various other embodiments, the master creditor records may not maintain the filtered version of each creditor name. In these embodiments, the filtered version of each creditor name is produced on-the-fly in the same manner as described with respect to step 304. From step 306, the process 300 proceeds to step 308.

At step 308, it is determined whether there is an exact match between the filtered creditor name and the filtered version of any creditor name in the master creditor records. If not, the process 300 proceeds to step 312 and ends without an exact match. If it is determined at step 308 that there is an exact match between the filtered creditor name and the filtered version of at least one creditor name in the master creditor records, the process 300 proceeds to step 310. At step 310, the name-matching module returns each matched creditor (e.g., by canonical creditor name or unique identifier). From step 310, the process 300 proceeds to step 312. At step 312, the process 300 ends.

Figure 4A:
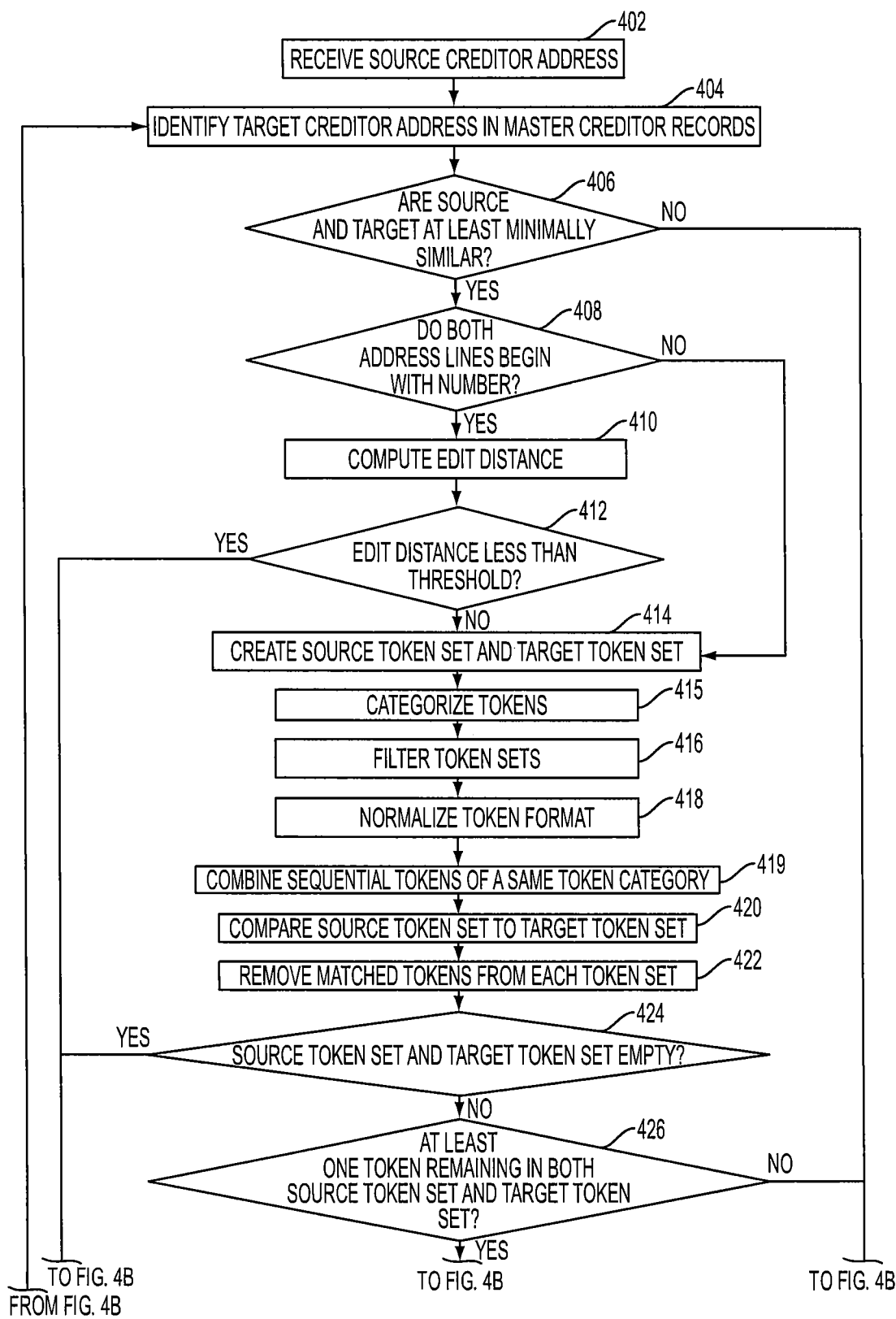
FIGS. 4A-4B illustrate a process for address matching.
Figure 4B:
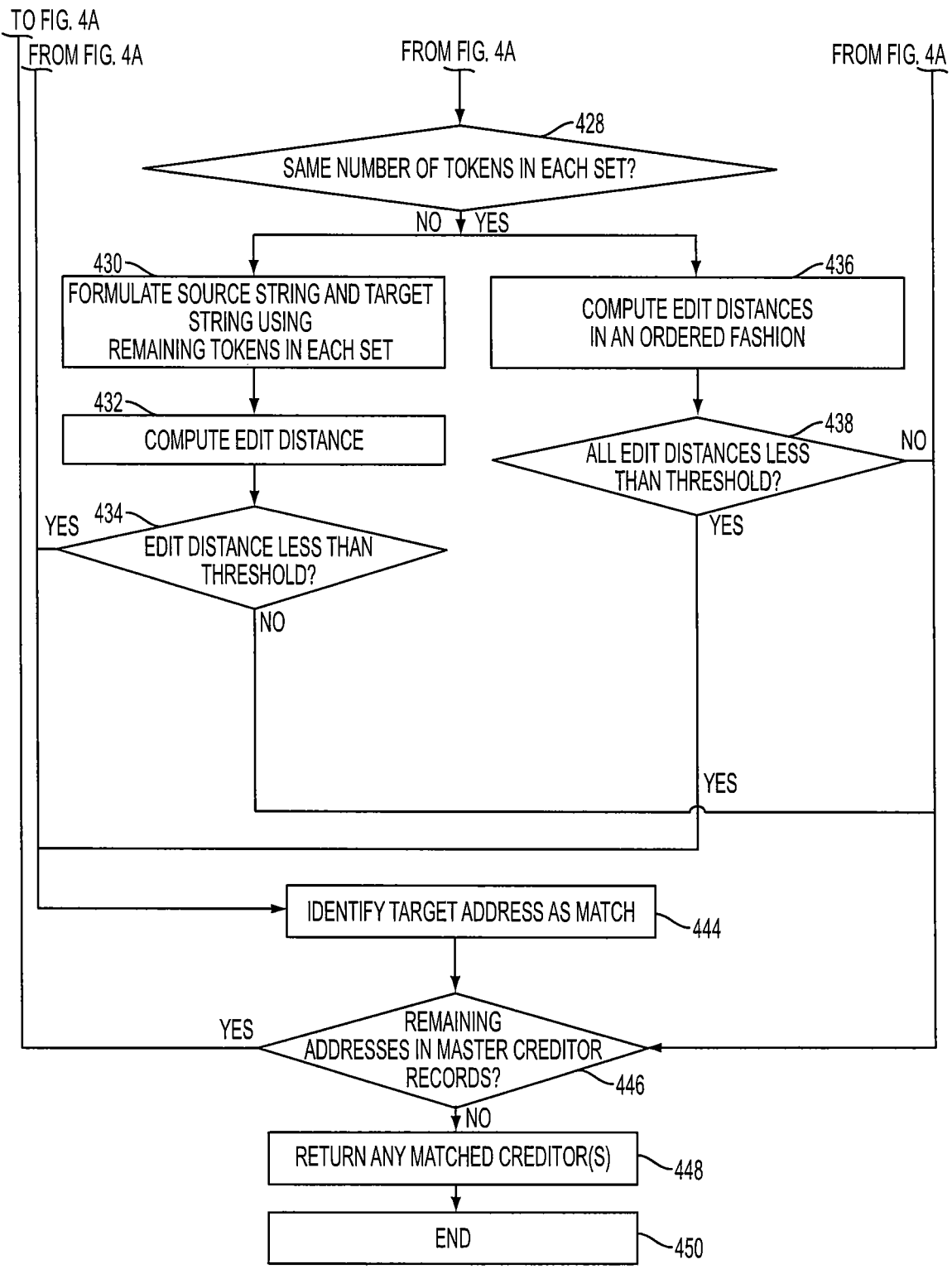

FIGS. 4A-4B illustrate a process 400 for address matching that may be performed by an address-matching module such as, for example, the address-matching module 216 of FIG. 2. The address-matching module is resident and executing on a server computer such as, for example, the at least one server computer 110 of FIG. 1 or the at least one server computer 210 of FIG. 2. The process 400 begins at step 402.

At step 402, the address-matching module receives a source creditor address. In a typical embodiment, the source creditor address includes address elements that have been extracted from a credit inquiry as part of credit monitoring of a monitored consumer. The address elements can include, for example, a city, a state or province, a ZIP code, an address line (e.g., street number, street name, P.O. Box, etc.), and the like. From step 402, the process 400 proceeds to step 404. At step 404, the address-matching module identifies a target creditor address from a master address list maintained by master creditor records such as, for example, the master creditor records 224 of FIG. 2. In a typical embodiment, the address-matching module systematically traverses the master address list so that each creditor address stored therein is eventually treated as the target creditor address. From step 404, the process 400 proceeds to step 406.

At step 406, the address-matching module determines whether the source creditor address and the target creditor address are at least minimally similarly. For example, the determination can encompass comparing a city, state or province, and ZIP code of the source creditor address to a city, state or province, and ZIP cod of the targeted creditor address. In various embodiments, the source creditor address and the target creditor address are deemed at least minimally similar if any two of city, state, and ZIP code exactly match. In various other embodiments, the source creditor address and the target creditor address are deemed at least minimally similarly if either: (1) both city and state exactly match; and (2) both ZIP code and state exactly match. Other criteria for determining minimal similarity may also be utilized.

If it is determined at step 406 that the source creditor address and the target creditor address are not at least minimally similar, the process 400 proceeds to step 446. In various embodiments, this determination is an efficient indication that the source creditor address and the target creditor address are highly unlikely to refer to a same physical location. Therefore, the computational expense of performing various ones of steps 408-444 can be avoided. If it is determined at step 406 that the source creditor address and the target creditor address are at least minimally similar, the process 400 proceeds to step 408.

At step 408, the address-matching module determines whether both an address line of the source creditor address and an address line of the target creditor address begin with a number (i.e., 0-9) as opposed, for example, to beginning with a letter or non-numeric symbol. In a typical embodiment, edit-distance functionality described with respect to steps 410-412 is deemed more effective when both the address line of the source creditor address and the address line of the target creditor address begin with a number. Therefore, if it is determined at step 408 that the address line of either the source creditor address or the target creditor address does not begin with a number, the process 400 proceeds to step 414 as a performance optimization. Alternatively, if it is determined at step 408 that both the address line of the source creditor address and the address line of the target creditor address begin with a number, the process 400 proceeds to step 410.

At step 410, the address-matching module computes an edit distance between the address line of the source creditor address and the address line of the target creditor address. In a typical embodiment, the edit distance can be computed as the minimum number of edits needed to transform one string into the other, with the allowable edit operations including, for example, insertion, deletion, or substitution or a single character or transportation, for example, of two characters. From step 410, the process 400 proceeds to step 412. At step 412, the address-matching module determines whether the computed edit distance is less than a pre-determined threshold. In various embodiments, the pre-determined threshold is configurable based on a desired margin of error for the address-matching module. If it is determined at step 412 that the computed edit distance is less than the pre-determined threshold, the process 400 proceeds to step 444 so that the source creditor address and the target creditor address can be identified as a match. Step 444 will be described in greater detail below. If it is determined at step 412 that the computed edit distance is not less than the pre-determined threshold, the process 400 proceeds to step 414.

At step 414, the address-matching module creates a source token set based on the address line of the source creditor address and a target token set based on the address line of the target creditor address (i.e., tokenization). In a typical embodiment, spaces are used as delimiters for the tokenization. However, it should be appreciated that other delimiters such as, for example, commas, periods, and the like may also be utilized depending on a format of the source creditor address and the target creditor address. From step 414, the process 400 proceeds to step 415.

At step 415, the address-matching module categorizes each token in the source token set and each token in the target token set into one of a plurality of categories. The plurality of categories can include, for example, empty token, numeric token, alpha token, and unknown token. For purposes of illustration, Table 1 below provides a description for the categories of empty token, numeric token, alpha token, and unknown token. From step 415, the process 400 proceeds to step 416.

TABLE 1

| TOKEN CATEGORY | DESCRIPTION |
| --- | --- |
| Empty Token | Indicates that the token has no contents. |
| Numeric Token | Indicates that the token contains at least one digit. |
| Alpha Token | Indicates that the token contains only letters and no digits. |
| Unknown Token | Indicates that the token is not an empty token, a numeric token, or an alpha token. |

At step 416, the address-matching module filters the source token set and the target token set to remove tokens deemed insignificant such as, for example, standard directional indicators (e.g., north, south, east, west), standard street suffixes (e.g., street, avenue, drive, etc.), and standard abbreviations thereof. From step 416, the process 400 proceeds to step 418. At step 418, the address-matching module normalizes a token format of the source token set and the target token set. For example, the normalization can include converting cardinal numbers (e.g., "one," "two," and "three") and ordinal numbers (e.g., "first," "second," and "third) to numeric equivalents. For example, "one" could be converted to "1" and "first" could be converted to "1st." From step 418, the process 400 proceeds to step 419.

At step 419, for each of the source, token set and the target token set, the address-matching module combines sequential tokens that have been categorized into a same token category. For example, if the first two tokens of the source token set have been categorized into the token category of alpha, those two tokens would be combined into a single token. By way of further example, if the first token and the third token of the source token set have been categorized into the token category of alpha while the second token has been categorized into the token category of numeric token, there is typically no basis for combining tokens. From step 419, the process 400 proceeds to step 420.

At step 420, the address-matching module compares the source token set to the target token set. In a typical embodiment, the comparison involves identifying each instance of an exact match between a token of the source taken set and a token of the target token set. Each exact match is typically represented by a token pair comprising one token from the source token set and one token from the target token set. From step 420, the process 400 proceeds to step 422. At step 422, the address-matching module removes each exact match from the source token set and the target token set as the exact match is identified. From step 422, the process 400 proceeds to step 424.

At step 424, it is determined whether the source token set and the target token set are empty. In a typical embodiment, the source token set and the target set being empty signifies that the source creditor address matches the target creditor address. Accordingly, if it is determined at step 424 that the source token set and the target token set are empty, the process 400 proceeds to step 444. If it is determined at step 424 that the source token set, the target token set, or both are not empty, the process 400 proceeds to step 426.

At step 426, the address-matching module determines whether at least one token remains in both the source token set and the target token set (i.e., whether both token sets are non-empty). If it is determined at step 426 that either the source token set or the target token set is empty, the process 400 proceeds to step 446. In a typical embodiment, this determination indicates that the source creditor address and the target creditor address do not match. If it is determine at step 426 that at least one token remains in both the source token set and the target token set, the process 400 proceeds to step 428.

At step 428, the address-matching module determines whether the source token set and the target token set contain a same number of tokens. In some embodiments, if it is determined at step 428 that the source token set and the target token set do not contain the same number of tokens, this determination indicates that the source creditor address and the target creditor address do not match. In these embodiments, the process 400 may proceed to step 446 (not illustrated). In various other embodiments, as illustrated, additional processing may be performed in an attempt to identify a match. In these embodiments, the process 4000 proceeds from step 428 to step 430 as illustrated.

At step 430, the address-matching module formulates a source string based on the remaining tokens in the source token set and a target string based on the remaining tokens in the target token set. In embodiments in which the tokenization described above uses spaces as delimiters, the address-matching module restores the spaces when formulating the source string and the target string. In that way, the source string is typically a concatenation of the remaining tokens of the source token set, in the order in which those tokens appear, such that each token is separate by a space. In similar fashion, the target string is typically a concatenation of the remaining tokens of the target token set, in the order in which those tokens appear, such that each token is separated by a space. From step 430, the process 400 proceeds to step 432.

At step 432, the address-matching module computes an edit distance between the source string and the target string in a similar fashion to that described above with respect to step 410. From step 432, the process 400 proceeds to step 434. At step 434, the address-matching module determines whether the computed edit distance is less than a predetermined threshold. In a typical embodiment, the predetermined threshold is specifically tuned for steps 432-434. Therefore, in a typical embodiment, the predetermined threshold utilized at step 434 may be different than the predetermined threshold utilized above at step 412. If it is determined at step 434 that the computed edit distance is less than the pre-determined threshold, the process 400 proceeds to step 444 so that the source creditor address and the target creditor address can be identified as a match. If it is determined at step 434 that the computed edit distance is not less than the pre-determined threshold, the process 400 proceeds to step 446. In a typical embodiment, this determination indicates that the source creditor address and the target creditor address do not match.

If it is determined at step 428 that the source token set and the target token set contain the same number of tokens, the process 400 proceeds to step 436. At step 436, the address-matching module computes an edit distance between each token pair in an ordered fashion. In particular, edit distances are computed between the first token of the source token set and the first token of the target token set, between the second token of the source token set and the second token of the target token set, etc. Thus, for example, if the source token set and the target token set each contain five tokens, five edit distances are computed. From step 436, the process 400 proceeds to step 438.

At step 438, the address-matching module determines whether all edit distances computed at step 436 are less than a predetermined threshold. In a typical embodiment, the predetermined threshold is specifically tuned for steps 436-438. Therefore, in a typical embodiment, the predetermined threshold utilized at step 438 may be different than the predetermined thresholds utilized above at steps 412 and 434. If it is determined at step 438 that fewer than all edit distances computed at step 436 are less than the predetermined threshold, the process 400 proceeds to step 446. In a typical embodiment, this determination indicates that the source creditor address and the target creditor address do not match. If it is determined at step 438 that all edit distances computed at step 436 are less than the predetermined threshold, the process 400 proceeds to step 444.

At step 444, the address-matching module identifies the target creditor address as matching the source creditor address. More specifically, the target creditor address and the source creditor address are deemed to be equivalent. In various embodiments, a creditor name associated with the source creditor address may be linked to a creditor name associated with the target creditor address in a temporary linking table. In a typical embodiment, the temporary linking table allows the link to be compared for consistency with results of other credit-inquiry analyses as described, for example, with respect to FIG. 10. From step 444, the process 400 proceeds to step 446.

If it is determined at step 442 that the source token set, the target token set, or both are not empty, the process 400 proceeds to step 446. In a typical embodiment, this determination indicates that the source creditor address and the target creditor address do not match. At step 446, it is determined whether there are additional creditor addresses in the master creditor records that have not been handled by the address-matching module. If so, the process 400 returns to step 404 for identification of another target creditor address. If it is determined at step 446 that there are no additional creditor addresses in the master creditor records that have not been handled by the address-matching module, the process 400 proceeds to step 448. At step 448, any matched creditors (i.e., creditors having addresses deemed to match the source creditor address) are returned. For example, any matched creditors may be returned by canonical creditor name or by a unique identifier. From step 448, the process 400 proceeds to step 450. At step 450, the process 400 ends.

In various embodiments, the process 400 may be further optimized by using principles of inverse domain frequency (IDF). IDF may be expressed as an inverse of a frequency of occurrence of a particular unigram in a domain corpus. In the context of the process 400, the domain corpus is an address list such as, for example, the master address list maintained by the master creditor records 224 of FIG. 2. In a typical embodiment, the domain corpus is not cleansed or filtered in any way. Rather, the domain corpus generally includes addresses as the addresses have appeared in credit inquiries. The address list, however, typically includes each variation of a particular address only once (ignoring e.g., capitalization).

The IDF can be calculated by: (1) counting how many times a unigram occurs in the domain corpus; and (2) computing a ratio of the count of all unigrams in the domain corpus to the count for a particular unigram. The compound ratio may be considered the IDF. For example, if there were 500,000 unigrams in the domain corpus and 10,000 of those were "Ave" while 50 of those were "Connecticut," the IDF for "Ave" would be 50 while the IDF for "Connecticut" would be 10,000.

With respect to the process 400 of FIG. 4. In various embodiments, the process 400 can be optimized by eliminating step 416 (filtering) in favor of a weighted edit-distance algorithm. In particular, if a source token contained "Connecticut Av" and a target token contained "Connecticut Ave," the source token and the target token would be divided into unigrams (i.e., "Connecticut" and "Av" for the source token and "Connecticut" and "Ave" for the target token), with the source token and the target token each constituting a phrase. "Connecticutt and "Av" may be considered source unigrams while "Connecticut" and "Ave" may be considered target unigrams. Thereafter, an edit distance between corresponding source unigrams and target unigrams can be computed in an ordered fashion (i.e., first unigram to first unigram, second unigram to second unigram, etc.). As described below, each edit distance can then be weighted based on the computed IDFs for the target unigrams.

For example, edit distances could be computer between "Connecticutt" and "Connecticut" and between "Av" and "Ave." Using the illustrative IDFs computed above, the edit distance can then be weighted in a normalized manner for the phase. First, a highest IDF for the phrase is typically identified. For purpose of this example, "Connecticut" has the highest IDF (i.e., 10,000). Subsequently, for each edit distance, the edit distance can be multiplied by a weight that is a ratio of a target unigram's IDF to the highest IDF. Therefore, the edit distance between "Connecticut" and "Connecticut" would be multiplied by 10,000/10,000 (i.e., one). Similarly, the edit distance between "Av" and "Ave" would be multiplied by 50/10,000 (i.e., 0.005). The weighted edit distances can then be summed to yield and edit distance for the phrase (i.e. the edit distance between the source token and the target token). In this fashion, IDF allows a contribution of common unigrams to be discounted in the weighted edit-distance algorithm. In various embodiments, the weighted edit-distance algorithm may be used for computing any edit distance referenced in the process 400.

Figure 5:
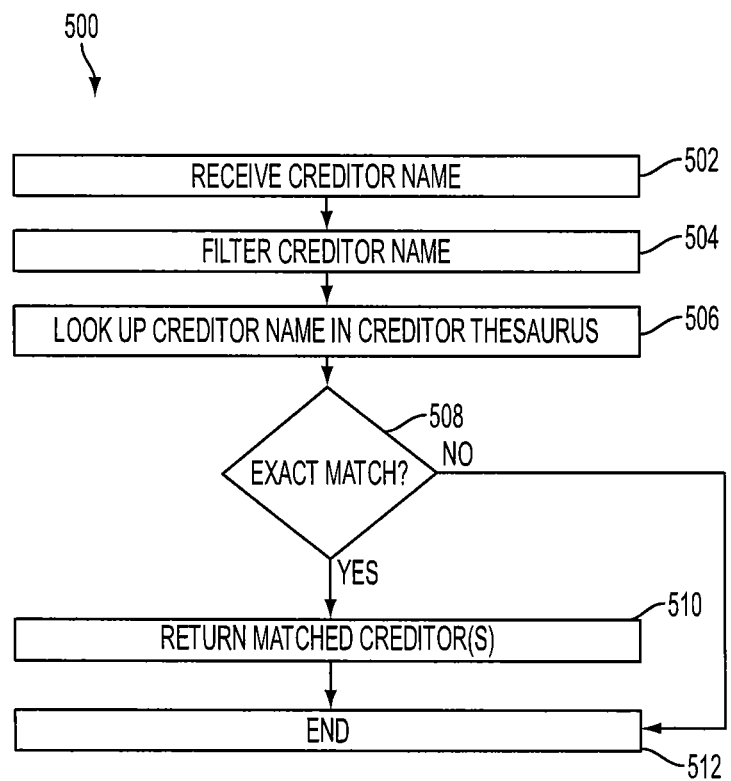
FIG. 5 illustrates a process for performing a creditor-thesaurus lookup.

FIG. 5 illustrates a process 500 for performing a creditor-thesaurus lookup. The process 500 is typically performed by a thesaurus module such as, for example, the thesaurus module 218 of FIG. 2. The thesaurus module is resident and executing on a server computer such as, for example, the at least one server computer 110 of FIG. 1 or at least one server computer 210 of FIG. 2. The process 500 begins at step 502.

At step 502, the thesaurus module receives a creditor name. In a typical embodiment, the creditor name has been extracted from a credit inquiry as part of credit monitoring of a monitored consumer. From step 502, the process 500 proceeds to step 504. At step 504, the thesaurus module filters the creditor name to remove, for example, spaces and punctuation. In various embodiments, the thesaurus module may also filter the creditor name to remove words deemed to be noise words such as, for example, "the," "and," and the like. From step 504, the process 500 proceeds to step 506.

At step 506, the thesaurus module looks up each filtered creditor name in a creditor thesaurus such as, for example, the creditor thesaurus 230 of FIG. 2. In a typical embodiment, the look-up involves comparing each filtered creditor name to a filtered version of each creditor name in the creditor thesaurus 230. In various embodiments, the creditor thesaurus maintain a filtered version of each creditor name stored therein. In these embodiments, no computation of the filtered version needs to occur. In various other embodiments, the creditor thesaurus may not maintain the filtered version of each creditor name stored therein. In these embodiments, the filtered version of each creditor name is produced on-the-fly in the same manner as described with respect to step 504. From step 506, the process 500 proceeds to step 508.

At step 508, it is determined whether there is an exact match between the filtered creditor name and the filtered version of any creditor name in the creditor thesaurus. If there is not an exact match, the process 500 proceeds to step 512 and ends without an exact match. If it is determined at step 508 that there is an exact match between the filtered creditor name and the filtered version of at least one creditor name in the creditor thesaurus, the process 500 proceeds to step 510. At step 510, the thesaurus module returns each matched creditor (e.g., by canonical creditor name, unique identifier, and/or a predetermined credit category if one exists). From step 510, the process 500 proceeds to step 512. At step 512, the process 500 ends.

Figure 6:
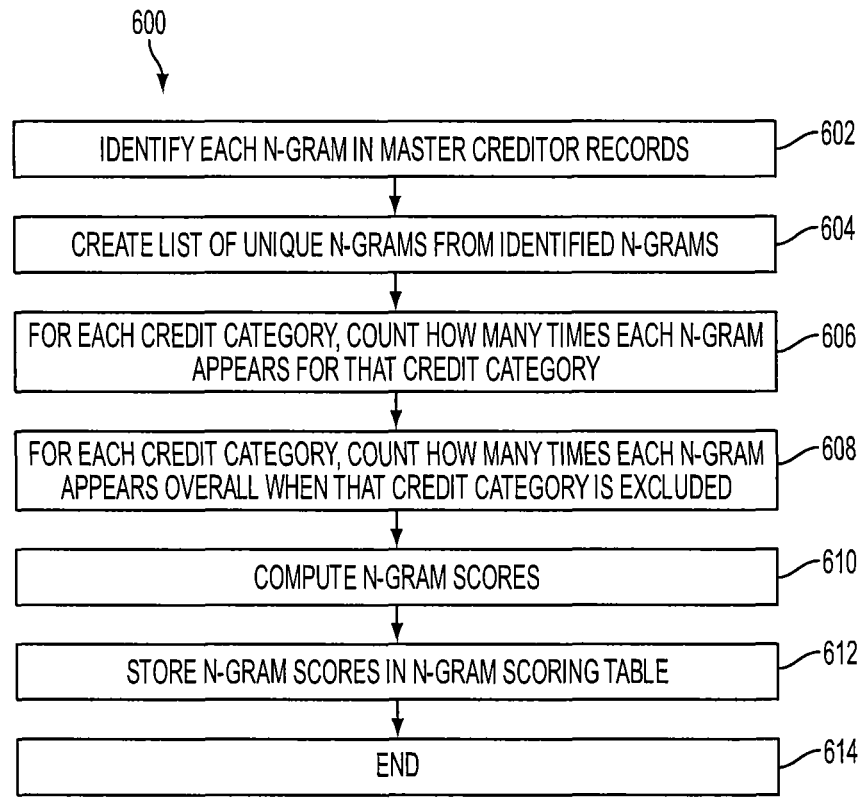
FIG. 6 describes a process for creating an n-gram scoring table.
Figure 7:
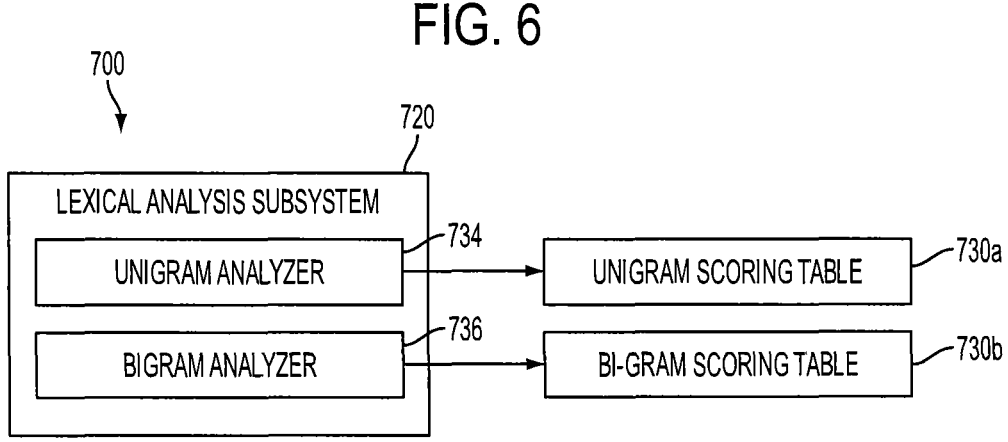
FIG. 7 illustrates a lexical-analysis subsystem.
Figure 8:
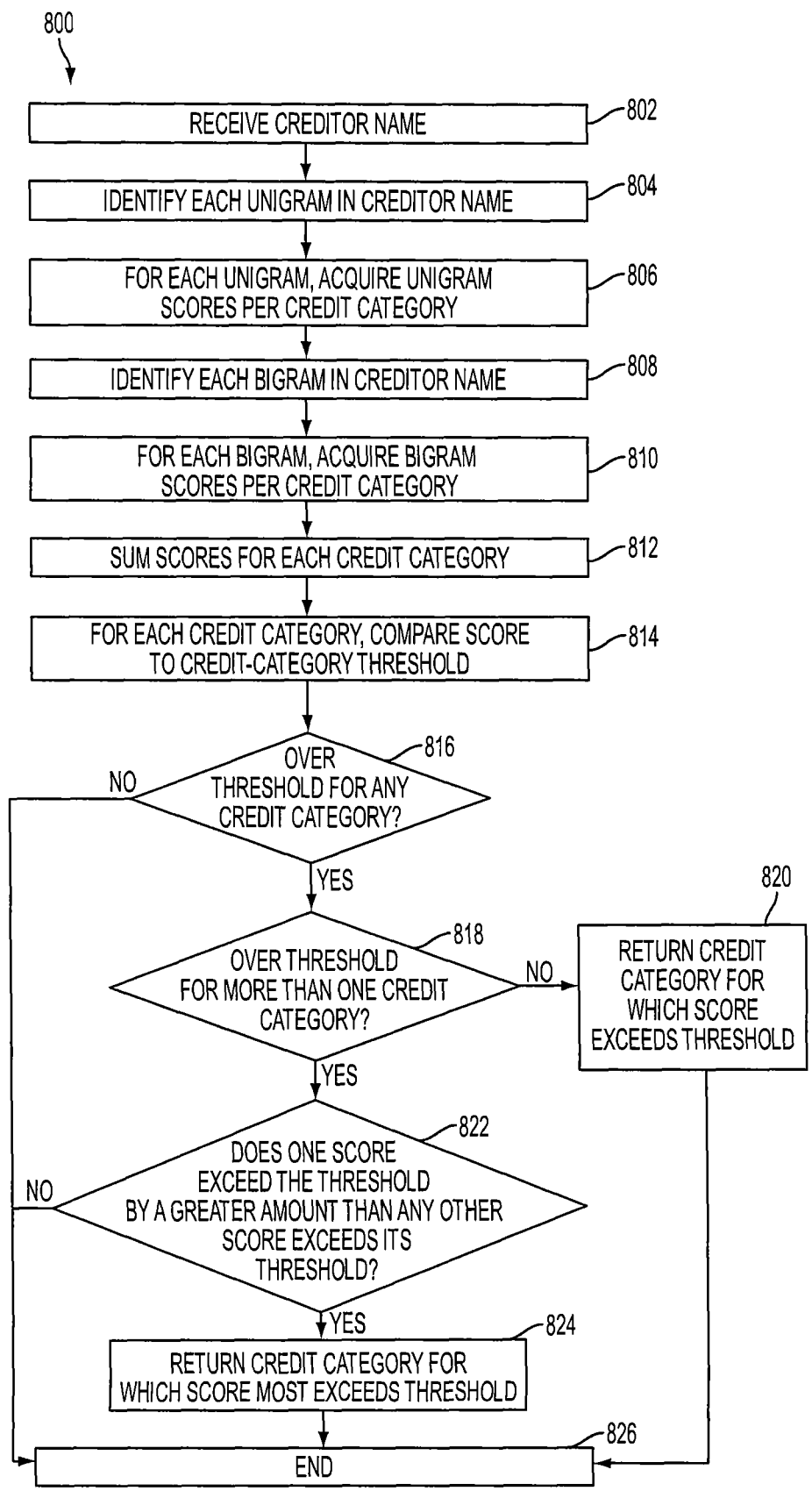
FIG. 8 illustrates a process for analyzing a creditor name using an n-gram scoring table.

FIGS. 6-8 describe exemplary functionality of a lexical-analysis subsystem such as, for example, the lexical-analysis subsystem 220 of FIG. 2. In particular, FIG. 6 describes a process 600 for creating an n-gram scoring table such as, for example, the one or more n-gram scoring tables 232 of FIG. 2. In various embodiments, the process 600 may be performed once, on demand, at regular intervals, or responsive to changes to master creditor records such as, for example, the master creditor records 224 of FIG. 2. The process 600 may be performed by a lexical-analysis subsystem such as, for example, the lexical-analysis subsystem 220 of FIG. 2. The lexical-analysis subsystem is resident and executing on a server computer such as, for example, the at least one server computer 110 of FIG. 1 or the at least one server computer 210 of FIG. 2. The process 600 begins at step 602.

At step 602, the lexical-analysis subsystem identifies all n-grams of an n-gram type that appear in each creditor name listed in a set of categorized creditors. As described above with respect to FIG. 2, master creditor records such as, for example, the master creditor records 224 of FIG. 2, typically associate at least a portion of the creditors listed therein with one or more of a plurality of credit categories. Therefore, the set of categorized creditors typically refers to those creditors that are associated with at least one credit category in the master creditor records. In a typical embodiment, creditors are only allowed to be associated with a single credit category. The n-gram type may specify, for example, unigrams, bigrams, or the like. In a typical embodiment, step 602 yields a set of zero or more n-grams for each categorized creditor (zero n-grams representing an empty set). From step 602, the process 600 proceeds to step 604.

At step 604, the lexical-analysis subsystem creates a list of unique n-grams from the identified n-grams. Each distinct string of the n-gram type (ignoring capitalization) is typically considered a unique n-gram. From step 604, the process 600 proceeds to step 606.

At step 606, the lexical-analysis subsystem counts how many times each unique n-gram appears per creditor category. As noted above, each creditor in the set of categorized creditors is typically associated with one or more credit categories. In a typical embodiment, the set of categorized creditors only includes creditors associated with a single credit category. Therefore, for each categorized creditor, n-grams from the creditor's name are counted towards the single credit category with which that creditor is associated.

In a typical embodiment, step 606 yields a plurality of n-gram counts for each unique n-gram. For a given unique n-gram, each n-gram count typically corresponds to a particular credit category. Table 2 below provides an example of the plurality of n-gram counts with respect to unigrams of "car," "motor," and "company" and credit categories of credit card, automobile loan, and home mortgage. The column "all other" encompasses the appearance of the unigrams "car," "motor," and "company" among uncategorized creditors. From step 606, the process 600 proceeds to step 608.

TABLE 2

|  | CREDIT CARD | AUTOMOBILE-LOAN | HOME MORTGAGE | ALL OTHER |
| --- | --- | --- | --- | --- |
| "CAR" | 3 | 352 | 2 | 1 |
| "MOTOR" | 5 | 453 | 21 | 10 |
| "COMPANY" | 234 | 247 | 231 | 300 |

At step 608, the lexical-analysis subsystem counts, for each credit category, how many times each unique n-gram appears overall when that credit category is excluded. In other words, for a given credit category and a given unique n-gram, step 608 produces an exclusion n-gram count. The exclusion n-gram count is an enumeration of how many times the given unique n-gram appears in the master creditor records for creditors that are not associated with the given credit category. In a typical embodiment, the exclusion n-gram count includes creditors associated with a different credit category as well as uncategorized creditors. In a typical embodiment, step 608 yields a plurality of exclusion n-gram counts for each unique n-gram. For a given unique n-gram, each exclusion n-gram count typically corresponds to a particular credit category. In a typical embodiment, the plurality of exclusion n-gram counts can be represented in a form similar to that shown above in Table 2. From step 608, the process 600 proceeds to step 610.

At step 610, a plurality of n-gram scores are computed for each unique n-gram. For a given unique n-gram, each n-gram score typically corresponds to a particular credit category. In a typical embodiment, the plurality of n-gram scores are computed from the plurality of n-gram counts and the plurality of exclusion n-gram counts. For example, an n-gram score for a particular n-gram relative to a particular credit category can be computed using Equation 1 below, where $C_1$ equals an n-gram count for the particular credit category and $C_2$ equals an exclusion n-gram count for the particular credit category.

$$\text{Score} = \log_{10} \frac{C_1}{C_2} \qquad \text{Equation 1}$$

For purpose of illustration, an example of the application of Equation 1 will now be described. With respect to Table 2, if it were desired to calculate an n-gram score for the n-gram of "CAR" and the credit category of automobile loan, $C_1$ would have a value of 352 and $C_2$ would have a value of 6. Therefore, the n-gram score would equal approximately 1.77. As an example of how an n-gram score might be negative, if it were desired to calculate an n-gram score for the n-gram of "MOTOR" and the credit category of credit card, $C_1$ would have a value of 5 and $C_2$ would have a value of 484. Therefore, the n-gram score would equal approximately −1.98. From step 610, the process 600 proceeds to step 612. At step 612, all n-gram scores computed at step 610 are stored by n-gram and credit category in an n-gram scoring table such as, for example, the one or more n-gram scoring tables 232 of FIG. 2. From step 612, the process 600 proceeds to step 614. At step 614, the process 600 ends.

FIG. 7 illustrates a lexical-analysis subsystem 720. The lexical-analysis subsystem 720 includes a unigram analyzer 734 and a bigram analyzer 736. In a typical embodiment, the unigram analyzer 734 is operable to create a unigram scoring table 730a utilizing a process such as, for example, the process 600 of FIG. 6. In a typical embodiment, the bigram analyzer 736 is operable to create a bigram scoring table 730b utilizing a process such as, for example, the process 600 of FIG. 6.

FIG. 8 illustrates a process 800 for analyzing a creditor name using an n-gram scoring table. The process 800 may be performed by a lexical-analysis subsystem such as, for example, the lexical-analysis subsystem 220 of FIG. 2 or the lexical-analysis subsystem 720 of FIG. 7. The lexical-analysis subsystem is resident and executing on a server computer such as, for example, the at least one server computer 110 of FIG. 1 or the at least one server computer 210 of FIG. 2. The lexical-analysis subsystem typically includes a unigram analyzer such as, for example, the unigram analyzer 734 of FIG. 7, and a bigram analyzer such as, for example, the bigram analyzer 736 of FIG. 7. The process 800 begins at step 802.

At step 802, the lexical-analysis subsystem receives a creditor name. In a typical embodiment, the received creditor name has been extracted from a credit inquiry as part of credit monitoring of a monitored consumer. From step 802, the process 800 proceeds to step 804. At step 804, the lexical-analysis subsystem identifies, via the unigram analyzer, each unigram that appears in the creditor name. From step 804, the process 800 proceeds to step 806. At step 806, the lexical-analysis subsystem acquires, for each identified unigram, unigram scores by credit category. In a typical embodiment, the unigram scores are acquired from a unigram scoring table such as, for example, the unigram scoring table 730a of FIG. 7. From step 806, the process 800 proceeds to step 808.

At step 808, the lexical-analysis subsystem identifies, via the bigram analyzer, each bigram that appears in the creditor name. From step 808, the process 800 proceeds to step 810. At step 810, the lexical-analysis subsystem acquires, for each identified bigram, bigram scores by credit category. In a typical embodiment, the bigram scores are acquired from a bigram scoring table such as, for example, the bigram scoring table 730b of FIG. 7. From step 810, the process 800 proceeds to step 812.

At step 812, the lexical-analysis subsystem sums the acquired unigram scores and the acquired bigram scores by credit category. Specifically, for a given credit category, all unigram scores and bigram scores applicable to the given credit category are summed to yield a credit-category score. In this manner, step 812 typically yields a credit-category score for each credit category. From step 812, the process 800 proceeds to step 814. At step 814, for each credit category, the credit-category score is compared to a score threshold that is specific to that credit category. From step 814, the process 800 proceeds to step 816.

At step 816, the lexical-analysis subsystem determines whether any credit-category score exceeds its respective threshold. If not, the process 800 proceeds to step 826 and ends without returning an inferred credit category. If it is determined at step 816 that at least one credit-category score exceeds its respective threshold, the process 800 proceeds to step 818. At step 818, the lexical-analysis subsystem determines whether more than one credit-category score exceeds its respective threshold. If not, the process 800 proceeds to step 820. At step 820, the lexical-analysis subsystem returns the credit category corresponding to the credit-category score that exceeds its respective threshold. The returned credit category represents a credit category inferred by the lexical-analysis subsystem based on the creditor name received at step 802. From step 820, the process 800 proceeds to step 826 and ends.

If it is determined at step 818 that more than one credit-category score exceeds its respective threshold, the process 800 proceeds to step 822. At step 822, the lexical-analysis subsystem determines whether one credit-category score exceeds its respective threshold by a greater amount than any other credit-category score exceeds its respective threshold. If not, the process 800 proceeds to step 826 and ends without returning an inferred credit category. If it is determined at step 822 that a particular credit-category score exceeds its respective threshold by a greater amount than any other credit-category score exceeds its respective threshold, the process 800 proceeds to step 824. At step 824, the lexical-analysis subsystem returns the credit category corresponding to the particular credit-category score. The returned credit category represents a credit category inferred by the lexical-analysis subsystem based on the creditor name received at step 802. From step 824, the process 800 proceeds to step 826 and ends.

Figure 9:
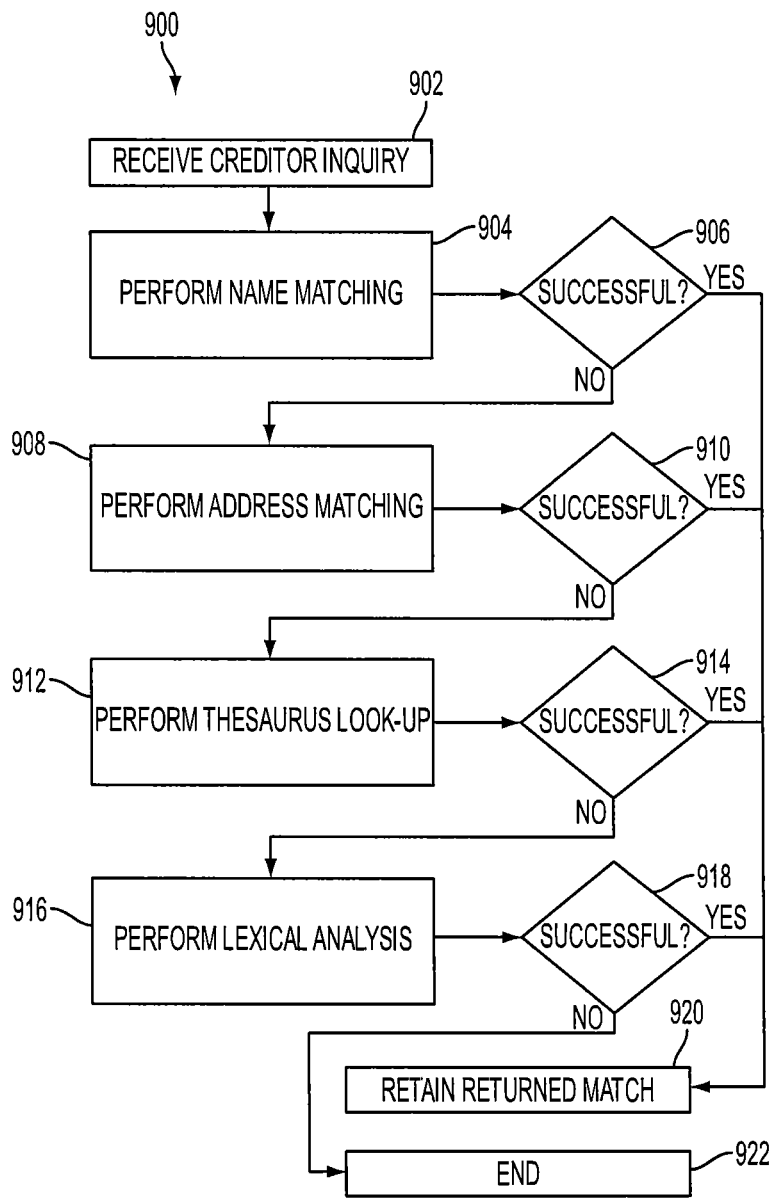
FIG. 9 illustrates a process for analyzing credit inquiries.

FIG. 9 illustrates a process 900 for analyzing credit inquiries. The process 900 may be executed by a server computer such as, for example, the at least one server computer 110 of FIG. 1 or the at least one server computer 210 of FIG. 2. In particular, the process 900 is facilitated by a combination of a name-matching module (e.g., the name-matching module 214 of FIG. 2), an address-matching module (e.g., the address-matching module 216 of FIG. 2), a thesaurus module (e.g., the thesaurus module 218 of FIG. 2), and a lexical-analysis subsystem (e.g., the lexical-analysis subsystem 220 of FIG. 2 or the lexical-analysis subsystem 720 of FIG. 7). The process 900 begins at step 902.

At step 902, the server computer receives a credit inquiry. The credit inquiry typically identifies a creditor responsible for the credit inquiry by at least a creditor name and a creditor address. From step 902, the process 900 proceeds to step 904. At step 904, the server computer performs name matching using the creditor name. In a typical embodiment, the server computer uses a name-matching module such as, for example, the name-matching module 214 of FIG. 2, that performs a name-matching process such as, for example, the process 300 of FIG. 3. From step 904, the process 900 proceeds to step 906.

At step 906, the server computer determines whether the name matching was successful. In a typical embodiment, what constitutes success is configurable based on a desired margin for error. In a typical embodiment, the name matching is considered successful if the name-matching module returns exactly one creditor from master creditor records such as, for example, the master creditor records 224 of FIG. 2, as a match. If it is determined at step 906 that the name matching was successful, the process 900 proceeds to stop 920. At step 920, the server computer retains the returned match. From step 920, the process 900 proceeds to step 922. At step 922, the process 900 ends.

If it is determined at step 906 that the name matching was not successful, the process 900 proceeds to step 908. At step 908, the server computer performs address matching using the creditor address. In a typical embodiment, the server computer utilizes an address-matching module such as, for example, the address-matching module 216 of FIG. 2, that performs an address-matching process such as, for example, the process 400 of FIGS. 4A-4B. From step 908, the process 900 proceeds to step 910.

At step 910, the server computer determines whether the address matching was successful. In a typical embodiment, what constitutes success is configurable based on a desired margin for error. In a typical embodiment, the address matching is considered successful if the address-matching module returns one match from the master creditor records. If it is determined at step 910 that the address matching was successful, the process 900 proceeds to step 920 and operates as described above.

If it is determined at step 910 that the address matching was not successful, the process 900 proceeds to step 912. At step 912, the server computer performs a creditor-thesaurus lookup. In a typical embodiment, the server computer utilizes a thesaurus module such as, for example, the thesaurus module 218 of FIG. 2, that performs a process such as, for example, the process 500 of FIG. 5. From step 912, the process 900 proceeds to step 914.

At step 914, the server computer determines whether the creditor-thesaurus lookup was successful. In a typical embodiment, what constitutes success is configurable based on a desirable margin for error. In a typical embodiment, the creditor-thesaurus lookup is considered successful if the thesaurus module returns one match from the master creditor records. If it is determined at step 914 that the thesaurus module was successful, the process 900 proceeds to step 920 and operates as described above.

If it is determined at step 914 that the thesaurus lookup was not successful, the process 900 proceeds to step 916. At step 916, the server computer performs a lexical analysis. In a typical embodiment, the server computer utilizes a lexical-analysis subsystem such as, for example, the lexical-analysis subsystem 220 of FIG. 2 or the lexical-analysis 720 of FIG. 7. The lexical-analysis subsystem typically performs a process such as, for example, the process 600 of FIG. 6 or the process 800 of FIG. 8. From step 916, the process 900 proceeds to step 918.

At step 918, the server computer determines whether the lexical analysis was successful. In a typical embodiment, what constitutes success is configurable based on a desired margin for error. In a typical embodiment, the lexical analysis is considered successful if the lexical-analysis subsystem returns one inferred credit category from the master creditor records. If it is determined at step 918 that the lexical-analysis subsystem was successful, the process 900 proceeds to step 920 and operates as described above. If it is determined at step 918 that the lexical analysis was not successful, the process 900 proceeds to step 922 and ends without a retained match.

As described above with respect to FIG. 9, processes of name matching, address matching, a thesaurus lookup, and a lexical analysis are shown to be performed in a particular order. While the particular order may have certain advantages in various embodiment, it should be appreciated that such processes can be performed in any particular sequence or in parallel. Additionally, in various embodiments, all or part of such processes may be performed regardless of whether any particularly process is deemed successful. For example, as described below with respect to FIG. 10, in various embodiments, a voting methodology may be implemented across a plurality of modules.

Figure 10:
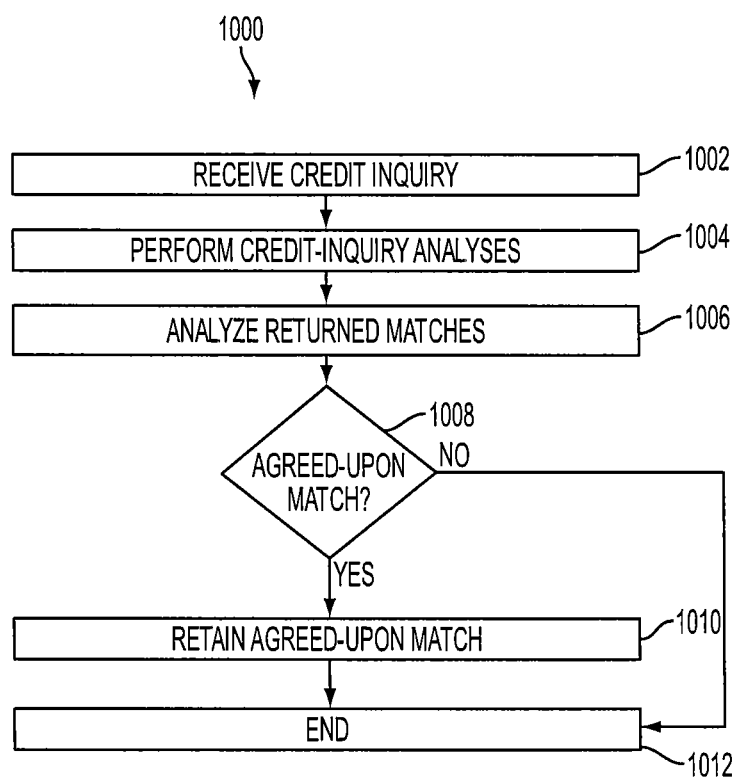
FIG. 10 illustrates a process for analyzing credit inquiries utilizing a voting methodology.

FIG. 10 illustrates a process 1000 for analyzing credit inquiries utilizing a voting methodology. The process 1000 may be executed by a server computer such as, for example, the at least one server computer 110 of FIG. 1 or the at least one server computer 210 of FIG. 2. The process 1000 begins at step 1002. At step 1002, the server computer receives a credit inquiry. The credit inquiry typically identifies a creditor responsible for the credit inquiry by at least a creditor name and a creditor address. From step 1002, the process 1000 proceeds to step 1004.

At step 1004, the server computer performs a plurality of credit-inquiry analyses on the credit inquiry. For example, in various embodiments, the server computer utilizes a name-matching module (e.g., the name-matching module 214 of FIG. 2), an address-matching module (e.g., the address-matching module 216 of FIG. 2), a thesaurus module (e.g., the thesaurus module 218 of FIG. 2), and a lexical-analysis subsystem (e.g., the lexical-analysis subsystem 220 of FIG. 2 or the lexical-analysis subsystem 720 of FIG. 7). In this manner, the server computer typically performs a name matching process (e.g., the process 300 of FIG. 3), an address-matching process (e.g., the process 400 of FIGS. 4A-4B), a creditor-thesaurus lookup (e.g., the process 500 of FIG. 5), and a lexical analysis (e.g., the process 600 of FIG. 6 or the process 800 of FIG. 8). From step 1004, the process 1000 proceeds to step 1006.

At step 1006, the server computer analyzes any returned matches from each of the name-matching module, the address-matching module, the thesaurus module, and the lexical-analysis subsystem. In a typical embodiment, the analysis encompasses comparing the returned matches to determine agreement. For example, the name-matching module, the thesaurus module, and/or the address-matching may be determine to agree to the extent each module returns a same creditor from master creditor records such as, for example, the master creditor records 224 of FIG. 2. By way of further example, an inferred credit category returned by the lexical-analysis subsystem may be determined to agree with a creditor returned by any of the name-matching module, the thesaurus module, and the address-matching module to the extent that the returned creditor is associated with the inferred credit category in the master creditor records. From step 1006, the process 1000 proceeds to step 1008.

At step 1008, it is determined whether there is an agreed-upon match among the plurality of analyses performed at step 1004. In a typical embodiment, what constitutes an agreed-upon match is a configurable threshold. For example, in various embodiments, an agreed-upon match is determined when any three of the name-matching module, the address-matching module, the thesaurus module, and the lexical-analysis module agree. By way of further example, each analysis of the plurality of analyses can be weighted according to a propensity of the analysis to be correct. It should be appreciated that numerous other combinations can also be specified as the configurable threshold.

If it is determined at step 1008 that there is an agreed-upon match, the process 1000 proceeds to step 1010. At step 1010, the agreed-upon match is retained. From step 1010, the process 1000 proceeds to step 1012. If it is determined at step 1008 that there is not an agreed-upon match, the process 1000 proceeds to step 1012 without a match being retained. At step 1012, the process 1000 ends.

In various embodiments, whenever a credit inquiry cannot be matched to either a particular creditor or a particular creditor category as described with respect to FIGS. 1-10, the credit inquiry can be tracked by a credit-monitoring system such as, for example, the credit-monitoring system 102 of FIG. 1. In a typical embodiment, unmatched credit inquiries can be grouped together using, for example, an exact-name match of creditor names. Particular groups of credit inquiries that have a high frequency count can be periodically reviewed to troubleshoot or optimize a credit-inquiry analysis performed by a name-matching module (e.g., the name-matching module 214 of FIG. 2), an address-matching module (e.g., the address-matching module 216 of FIG. 2), a thesaurus module (e.g., the thesaurus module 218 of FIG. 2), and/or a lexical-analysis subsystem (e.g., the lexical-analysis subsystem 220 of FIG. 2 or the lexical-analysis subsystem 720 of FIG. 7).

Figure 11:
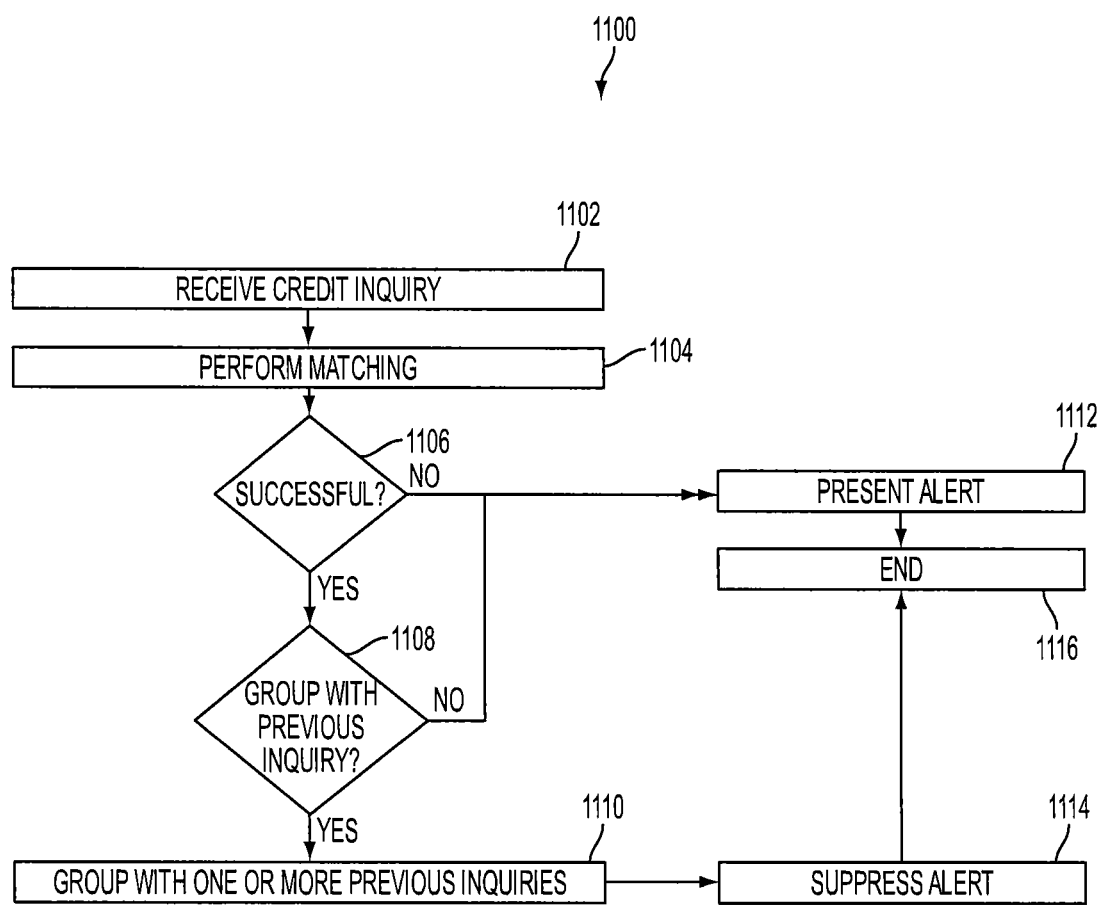
FIG. 11 illustrates a process for identifying related credit inquiries.

FIG. 11 illustrates a process 1100 for identifying related credit inquiries based on, for example, methodologies described above with respect to FIGS. 1-10. The process 1100 may be executed by a server computer such as, for example, the at least one server computer 110 of FIG. 1 or the at least one server computer 210 of FIG. 2. The process 1100 begins at step 1102. At step 1102, the server computer receives a credit inquiry for a monitored consumer. The credit inquiry typically identifies a creditor responsible for the credit inquiry by at least a creditor name and a creditor address. From step 1102, the process 1100 proceeds to step 1104.

At step 1104, the server computer performs a matching process. In various embodiments, the matching process may include one or more credit-inquiry analyses as described with respect to FIGS. 1-10. From step 1104, the process 1100 proceeds to step 1106. At step 1106, it is determined whether the matching process was successful. In a typical embodiment, the matching process is deemed successful if exactly one creditor or credit category is returned. If it is determined at step 1106 that the matching process was not successful, the process 1100 proceeds to step 1112. At step 1112, the server computer alerts the monitored consumer of the credit inquiry. From step 1112, the process 1110 proceeds to step 1116. At step 1116, the process 1100 ends.

If it is determined at step 1106 that the matching process was successful, the process 1100 proceeds to step 1108. At step 1108, the server computer determines whether the credit inquiry should be grouped with a previously-received inquiry. In a typical embodiment, it is determined that the credit inquiry should be grouped with a previously-received credit inquiry if the monitored consumer has had another credit inquiry for a same creditor or a same credit category within a predetermined window of time (e.g., four days). If it is determined at step 1108 that the credit inquiry should not be grouped with a previously-received credit inquiry, the process 1100 proceeds to step 1112 and operates as described above.

If it is determine at step 1108 that the credit inquiry should be grouped with a previously-received credit inquiry, the process 1100 proceeds to step 1110. At step 1110, the credit inquiry is grouped with each credit inquiry for which it has been determined that the credit inquiry should be grouped. From step 1110, the process 1100 proceeds to step 1114. At step 1114, the server computer suppresses a credit alert for the credit inquiry that would otherwise have been presented to the monitored consumer. From step 1114, the process 1100 proceeds to step 1116. At step 1116, the process 1100 ends.

In various embodiments, the process 1100 if FIG. 11 is facilitated by maintaining temporary tables. A server computer such as, for example, the server computer 110 of FIG. 1 or the server computer 210 of FIG. 2 of FIG. 2, can maintain a temporary table for each monitored consumer that sets forth each credit inquiry within a predetermined window of time (e.g., four days). Each temporary table typically includes a row for each credit inquiry occurring within the predetermine window of time. To the extent the information is available, the temporary table can include, for each credit inquiry, a canonical name for a creditor, a creditor address, a credit category, a date, an indication of whether a credit alert was issued or suppressed, and/or other like information.

The temporary tables can be consulted, for example, at step 1108 of the process 1100, as part of determining whether a particular credit inquiry should be grouped with a previous inquiry. In that way, the temporary tables can serve as a record of previous credit inquiries for monitored consumers within the predetermined window of time. In a typical embodiment, the server computer updates the temporary tables to remove aging credit inquiries that no longer fall within the predetermined window of time.

For a given new credit inquiry that is received, the server computer generally updates a corresponding temporary table at the conclusion of a process such as, for example, the process 1100 of FIG. 1. Following the process 1100, the server computer will generally have gleaned a canonical creditor name, a creditor address, and/or a credit category for the given new credit inquiry. Therefore, the server computer can add a new row to the corresponding temporary table that includes an identifier for the given new credit inquiry, the canonical creditor name, the creditor address, and/or the credit category for the given new credit inquiry. The new row can further include a date of the given credit inquiry and an indication of whether a credit alert was issued or suppressed. The corresponding temporary table as updated can then be used in future iterations of the process 1100.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A system comprising:
one or more databases configured to electronic files of consumers and information related to credit inquiries on the credit files of the consumers;
a server computer communicably coupled to the one or more databases, wherein the server computer is programmed to:
access an electronic file of a monitored user to identify a credit event, wherein the electronic file is stored in a data store;
extract, from the electronic file information related to the credit event, the extracted information comprising a name of an initiator of the credit event and at least one other field;

perform name matching using the name of the initiator of the credit event and stored names in master records;

perform token-based matching using the at least one other field and corresponding fields in the master records;

perform a lexical analysis of the name of the initiator of the inquiry event;

determine an agreed-upon multi-module match among the name matching, the token-based matching, and the lexical analysis;

determine, based at least in part on the agreed-upon multi-module match whether there is a related credit event of the monitored user that occurred within a predetermined window of time of the identified credit event; and responsive to a determination that there is not a related credit event of the monitored user that occurred within a predetermined window of time of the identified credit event, generate and send an alert of the identified credit event to the monitored user.

2. The system of claim 1, the one or more databases is further configured to store master creditor records which comprise a master name list and a master address list.

3. The system of claim 2, performing the name matching analysis comprises looking up the name of the initiator from the master name list and returning creditors from the master records whose name matches the name of the initiator.

4. The system of claim 2, performing the token based matching comprises:

creating a source token set based on an address of the initiator;

creating a target token set based on an address of a creditor in a master address list;

categorizing each token in the source token set and each token in the target set into a plurality of categories;

filtering the source token set and the target token set to remove tokens deemed insignificant;

for each of the source token set and the target token set, combining sequential tokens that have been categorized a same category;

identifying each instance of an exact match between a token of the source token set and a token of the target token set;

removing the token of the source token set from the source token set and removing the token of the target token set from the target token set where the exact match occur; and detecting a match between the source token set and the target set in response to a determination that the source token set and the target token set are empty.

5. The system of claim 2, the server computer is further programmed to perform a thesaurus lookup on the name of the initiator to identify a match from the master records.

6. The system of claim 1, the lexical analysis comprises an n-grams analysis on a sequence of words in the name of the initiator.

7. The system of claim 1, the server computer is further programmed to: responsive to a determination that there is a related credit event of the monitored user that occurred within the predetermined window of time of the identified credit event, preventing the computer system from generating the alert.

8. A method comprising, by a computer system comprising at least one processor and memory:

accessing an electronic file of a monitored user to identify a credit event, wherein the electronic file is stored in a data store;

extracting, from the electronic file information related to the credit event, the extracted information comprising a name of an initiator of the credit event and at least one other field;

performing name matching using the name of the initiator of the credit event and stored names in master records;

performing token-based matching using the at least one other field and corresponding fields in the master records;

performing a lexical analysis of the name of the initiator of the inquiry event;

determining an agreed-upon multi-module match among the name matching, the token-based matching, and the lexical analysis;

determining, based at least in part on the agreed-upon multi-module match whether there is a related credit event of the monitored user that occurred within a predetermined window of time of the identified credit event; and responsive to a determination that there is not a related credit event of the monitored user that occurred within a predetermined window of time of the identified credit event, generating and sending an alert of the identified credit event to the monitored user.

9. The method of claim 8, performing the name matching analysis comprises looking up the name of the initiator from the master records and returning creditors from the master records whose name matches the name of the initiator.

10. The method of claim 8, performing the token-based matching comprises:

creating a source token set based on an address of the initiator;

creating a target token set based on an address of a creditor in a master address list;

categorizing each token in the source token set and each token in the target set into a plurality of categories;

filtering the source token set and the target token set to remove tokens deemed insignificant;

for each of the source token set and the target token set, combining sequential tokens that have been categorized a same category;

identifying each instance of an exact match between a token of the source token set and a token of the target token set;

removing the token of the source token set from the source token set and removing the token of the target token set from the target token set where the exact match occur; and detecting a match between the source token set and the target set in response to a determination that the source token set and the target token set are empty.

11. The method of claim 8, further comprising performing a thesaurus lookup on the name of the initiator to identify a match from the master records.

12. The method of claim 8, the lexical analysis comprises an n-grams analysis on a sequence of words in the name of the initiator.

13. The method of claim 8, further comprising: responsive to a determination that there is a related credit event of the monitored user that occurred within the predetermined window of time of the identified credit event, preventing the computer system from generating the alert.

14. A non-transitory computer readable medium storing software instructions thereon, the software instructions cause a computer system to:
- access an electronic file of a monitored user to identify a credit event, wherein the electronic file is stored in a data store;
- extract, from the electronic file information related to the credit event, the extracted information comprising a name of an initiator of the credit event and at least one other field;
- perform name matching using the name of the initiator of the credit event and stored names in master records;
- perform token-based matching using the at least one other field and corresponding fields in the master records;
- perform a lexical analysis of the name of the initiator of the inquiry event;
- determine an agreed-upon multi-module match among the name matching, the token-based matching, and the lexical analysis;
- determine, based at least in part on the agreed-upon multi-module match whether there is a related credit event of the monitored user that occurred within a predetermined window of time of the identified credit event; and
- responsive to a determination that there is not a related credit event of the monitored user that occurred within a predetermined window of time of the identified credit event, generate and send an alert of the identified credit event to the monitored user.

15. The non-transitory computer readable medium of claim 14, performing the name matching analysis comprises looking up the name of the initiator from the master records and returning creditors from the master records whose name matches the name of the initiator.

16. The non-transitory computer readable medium of claim 15, the software instructions further cause the computer system to perform a thesaurus lookup on the name of the initiator to identify a match from the master records.

17. The non-transitory computer readable medium of claim 15, the master records comprises a master name list and a master address list.

18. The non-transitory computer readable medium of claim 14, performing the token based matching comprises:
- creating a source token set based on an address of the initiator;
- creating a target token set based on an address of a creditor in a master address list;
- categorizing each token in the source token set and each token in the target set into a plurality of categories;
- filtering the source token set and the target token set to remove tokens deemed insignificant;
- for each of the source token set and the target token set, combining sequential tokens that have been categorized a same category;
- identifying each instance of an exact match between a token of the source token set and a token of the target token set;
- removing the token of the source token set from the source token set and removing the token of the target token set from the target token set where the exact match occur; and
- detecting a match between the source token set and the target set in response to a determination that the source token set and the target token set are empty.

19. The non-transitory computer readable medium of claim 14, the lexical analysis comprises an n-grams analysis on a sequence of words in the name of the initiator.

20. The non-transitory computer readable medium of claim 14, the software instructions further cause the computer system to: responsive to a determination that there is a related credit event of the monitored user that occurred within the predetermined window of time of the identified credit event, prevent the computer system from generating the alert.

* * * * *

UNITED STATES PATENT AND TRADEMARK OFFICE
CERTIFICATE OF CORRECTION

PATENT NO. : 10,592,982 B2
APPLICATION NO. : 15/434551
DATED : March 17, 2020
INVENTOR(S) : Steven E. Samler et al.

Page 1 of 4

It is certified that error appears in the above-identified patent and that said Letters Patent is hereby corrected as shown below:

On the Title Page

Column 1, Item (63), Line 3, under Related U.S. Application Data, delete "13/282,566," and insert --13/828,566,--.

On Page 2, Column 1, Item (56), Line 66, under U.S. Patent Documents, delete "6,448,389" and insert --6,448,889--.

On Page 3, Column 2, Item (56), Line 27, under U.S. Patent Documents, delete "Coggeshail" and insert --Coggeshall--.

On Page 4, Column 2, Item (56), Line 42, under U.S. Patent Documents, delete "Coggeshail" and insert --Coggeshall--.

On Page 5, Column 2, Item (56), Line 57, under U.S. Patent Documents, delete "5/2005" and insert --6/2005--.

On Page 7, Column 2, Item (56), Line 50, under U.S. Patent Documents, delete "Melik-Asianian" and insert --Melik-Aslanian--.

On Page 7, Column 2, Item (56), Line 78, under U.S. Patent Documents, delete "2010/0159947" and insert --2010/0169947--.

On Page 9, Column 1, Item (56), Line 22, under Other Publications, delete "proguest" and insert --proquest--.

On Page 9, Column 2, Item (56), Line 35, under Other Publications, delete "proguest" and insert --proquest--.

On Page 9, Column 2, Item (56), Line 43, under Other Publications, delete "htmi" and insert --html--.

Signed and Sealed this
Thirtieth Day of June, 2020

Andrei Iancu
*Director of the United States Patent and Trademark Office*

CERTIFICATE OF CORRECTION (continued)
U.S. Pat. No. 10,592,982 B2

On Page 9, Column 2, Item (56), Line 60, under Other Publications, delete "UnobservablesKarlanZinman.pdf." and insert --Unobservables.KarlanZinman.pdf.--.

On Page 9, Column 2, Item (56), Line 69, under Other Publications, delete "5603072" and insert --5608072--.

On Page 10, Column 1, Item (56), Line 18, under Other Publications, delete "calicredit" and insert --callcredit--.

On Page 10, Column 1, Item (56), Line 20, under Other Publications, delete "display-" and insert --display=--.

On Page 10, Column 1, Item (56), Line 50, under Other Publications, delete "6," and insert --16,--.

On Page 10, Column 2, Item (56), Line 11, under Other Publications, delete "Page-1," and insert --Page=1,--.

On Page 10, Column 2, Item (56), Line 41, under Other Publications, delete "cz=TS" and insert --c=TS--.

In the Drawings

On Sheet 7 of 11, FIG. 7, reference numeral 730b, Line 1, delete "BI-GRAM" and insert --BIGRAM--.

In the Specification

In Column 1, Line 63, delete "on" and insert --one--.

In Column 3, Line 10, delete "below" and insert --below,--.

In Column 3, Line 54, delete "communication" and insert --communications--.

In Column 4, Line 25, delete "Example" and insert --Examples--.

In Column 5, Line 14, delete "in" and insert --of--.

In Column 5, Line 29, delete "associated" and insert --associate--.

In Column 5, Line 32, delete "a" and insert --at--.

In Column 5, Line 36, delete "226)." and insert --(i.e., a many-to-one relationship between the list of alternative names and the creditor name 226).--.

In Column 5, Lines 37-38, delete "lexical analysis" and insert --lexical-analysis--.

CERTIFICATE OF CORRECTION (continued)
U.S. Pat. No. 10,592,982 B2

In Column 5, Line 62, delete "modules" and insert --module--.

In Column 5, Line 66, delete "an" and insert --and--.

In Column 6, Line 24, delete "situation" and insert --situations--.

In Column 6, Line 27, delete "lexical analysis" and insert --lexical-analysis--.

In Column 7, Line 19, delete "From the" and insert --From--.

In Column 8, Line 5, delete "similarly." and insert --similar.--.

In Column 8, Line 8, delete "cod" and insert --code--.tb

In Column 8, Line 8, delete "targeted" and insert --target--.

In Column 8, Line 14, delete "similarly" and insert --similar--.

In Column 8, Line 14, delete "match; and" and insert --match; or--.

In Column 8, Line 51, delete "or" and insert --of--.

In Column 8, Line 52, delete "transportation," and insert --transposition,--.

In Column 9, Line 44, delete "source, token" and insert --source token--.

In Column 9, Line 59, delete "taken" and insert --token--.

In Column 10, Line 17, delete "determine" and insert --determined--.

In Column 10, Line 31, delete "4000" and insert --400--.

In Column 10, Line 42, delete "separate" and insert --separated--.

In Column 12, Line 3, delete "(ignoring" and insert --(ignoring,--.

In Column 12, Line 8, delete "compound" and insert --computed--.

In Column 12, Line 14, delete "FIG. 4. In" and insert --FIG. 4, in--.

In Column 12, Line 18, delete ""Connecticut"" and insert --"Connecticutt"--.

In Column 12, Line 20, delete ""Connecticut"" and insert --"Connecticutt"--.

In Column 12, Line 31, delete "computer" and insert --computed--.

CERTIFICATE OF CORRECTION (continued)
U.S. Pat. No. 10,592,982 B2

In Column 12, Line 35, delete "phase." and insert --phrase.--.

In Column 12, Line 36, delete "purpose" and insert --purposes--.

In Column 12, Line 40, delete ""Connecticut"" and insert --"Connecticutt"--.

In Column 12, Line 44, delete "and" and insert --an--.

In Column 12, Line 56, delete "or at least" and insert --or the at least--.

In Column 14, Line 5, delete "the creditor's" and insert --that creditor's--.

In Column 14, Line 62, delete "purpose" and insert --purposes--.

In Column 17, Line 1, delete "stop" and insert --step--.

In Column 17, Line 34, delete "desirable" and insert --desired--.

In Column 17, Line 66, delete "embodiment," and insert --embodiments,--.

In Column 18, Line 3, delete "particularly" and insert --particular--.

In Column 18, Lines 26-27, delete "name matching" and insert --name-matching--.

In Column 18, Line 40, delete "determine" and insert --determined--.

In Column 19, Line 5, delete "creditor" and insert --credit--.

In Column 19, Line 60, delete "determine" and insert --determined--.

In Column 20, Line 4, delete "if" and insert --of--.

In Column 20, Line 12, delete "predetermine" and insert --predetermined--.